US011551117B1

(12) United States Patent
Malhotra

(10) Patent No.: US 11,551,117 B1
(45) Date of Patent: Jan. 10, 2023

(54) POLICY BASED ARTIFICIAL INTELLIGENCE ENGINE

(71) Applicant: Reena Malhotra, Moraga, CA (US)

(72) Inventor: Reena Malhotra, Moraga, CA (US)

(73) Assignee: Reena Malhotra, Moraga, CA (US)

( * ) Notice: Subject to any disclaimer, the term of this patent is extended or adjusted under 35 U.S.C. 154(b) by 325 days.

(21) Appl. No.: 16/852,206

(22) Filed: Apr. 17, 2020

Related U.S. Application Data

(60) Provisional application No. 62/926,305, filed on Oct. 25, 2019.

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC ................................. G06N 5/04; G06N 20/00
See application file for complete search history.

(56) References Cited

U.S. PATENT DOCUMENTS

| 11,405,189 | B1* | 8/2022 | Bennison | H04L 9/0656 |
| 2017/0170957 | A1* | 6/2017 | Smith | H04L 9/0877 |
| 2019/0087433 | A1* | 3/2019 | Gan | G06F 16/148 |
| 2019/0104022 | A1* | 4/2019 | Power | H04L 43/20 |
| 2022/0139070 | A1* | 5/2022 | Okamoto | G06V 20/54 |
|  |  |  |  | 382/159 |
| 2022/0164026 | A1* | 5/2022 | Sicconi | G08B 5/223 |

* cited by examiner

*Primary Examiner* — Harry H Kim

(57) ABSTRACT

Systems and methods to provide a recommendation for an action based on an application policy are disclosed. The application policy may be associated with an organization. An application policy engine can use an artificial intelligence (AI) engine to execute a machine learning (ML) model. The application policy engine may receive real time video data or audio data, and obtain metadata comprising reference data or environment data. The application policy engine can process the real time video data or audio data using the ML model to infer biometric characteristics associated with a subject. The application policy engine can determine if the application policy was met, conformed to, or missed based on a correlation between the metadata and the inferred biometric characteristics, and provide a corresponding recommendation for an action.

20 Claims, 9 Drawing Sheets

| | | APPLICATION POLICY 408 | | | |
|---|---|---|---|---|---|
| | FIRST CONDITION 702a | SECOND CONDITION 702b | THIRD CONDITION 702c | NTH CONDITION 702n | POLICY THRESHOLD 704 | RECOMMENDATION 706 |
| 700a | HIGH CRIME AREA | CRIMINAL HISTORY | NO WEAPON OR OTHER VISIBLE THREAT | ANGRY EXPRESSIONS | POLICY VIOLATED (SECOND LEVEL) | MAKE AN ARREST |
| 700b | LOW CRIME AREA | NO CRIMINAL HISTORY | TRAFFIC VIOLATION | PLEADING | POLICY VIOLATED (FIRST LEVEL) | ISSUE A TICKET |
| 700c | NO CRIMINAL ACTIVITY IN THE AREA | NO CRIMINAL HISTORY | NO WEAPON OR OTHER VISIBLE THREAT | APOLOGETIC TONE | POLICY MET | NO ACTION |
| 700d | NO CRIMINAL ACTIVITY IN THE AREA | NO INFORMATION AVAILABLE | HANDS IN THE AIR | FEARFUL EXPRESSIONS | POLICY MISSED | UPDATE MISSING INFORMATION |
| | . . . | . . . | . . . | . . . | . . . | . . . |
| 700m | HOMICIDE IN THE AREA | OPEN WARRANT | POINTING A WEAPON | THREATENING TONE | POLICY VIOLATED (HIGHEST LEVEL) | USE THE FIREARM |

FIG. 7

POLICY BASED ARTIFICIAL INTELLIGENCE ENGINE

CROSS-REFERENCE TO RELATED APPLICATIONS

This application is non-provisional and claims priority to U.S. Provisional Application No. 62/926,305, filed Oct. 25, 2019, entitled "policy based artificial intelligence engine," which is incorporated herein by reference in its entirety for all purposes.

BACKGROUND

Human actions performed in response to a situation may be a byproduct of biases, emotions, preconceived notions, mental or physical state of the human, insufficient information or time, among others. Some situations may result in injury or loss of life because of erroneous human actions.

BRIEF DESCRIPTION OF THE DRAWINGS

FIG. 7 illustrates an example representation of an application policy in certain embodiments;

FIG. 9 illustrates a computer-implemented method to generate a recommendation for an action based on an application policy, in certain embodiments.

DETAILED DESCRIPTION

Figure 1:
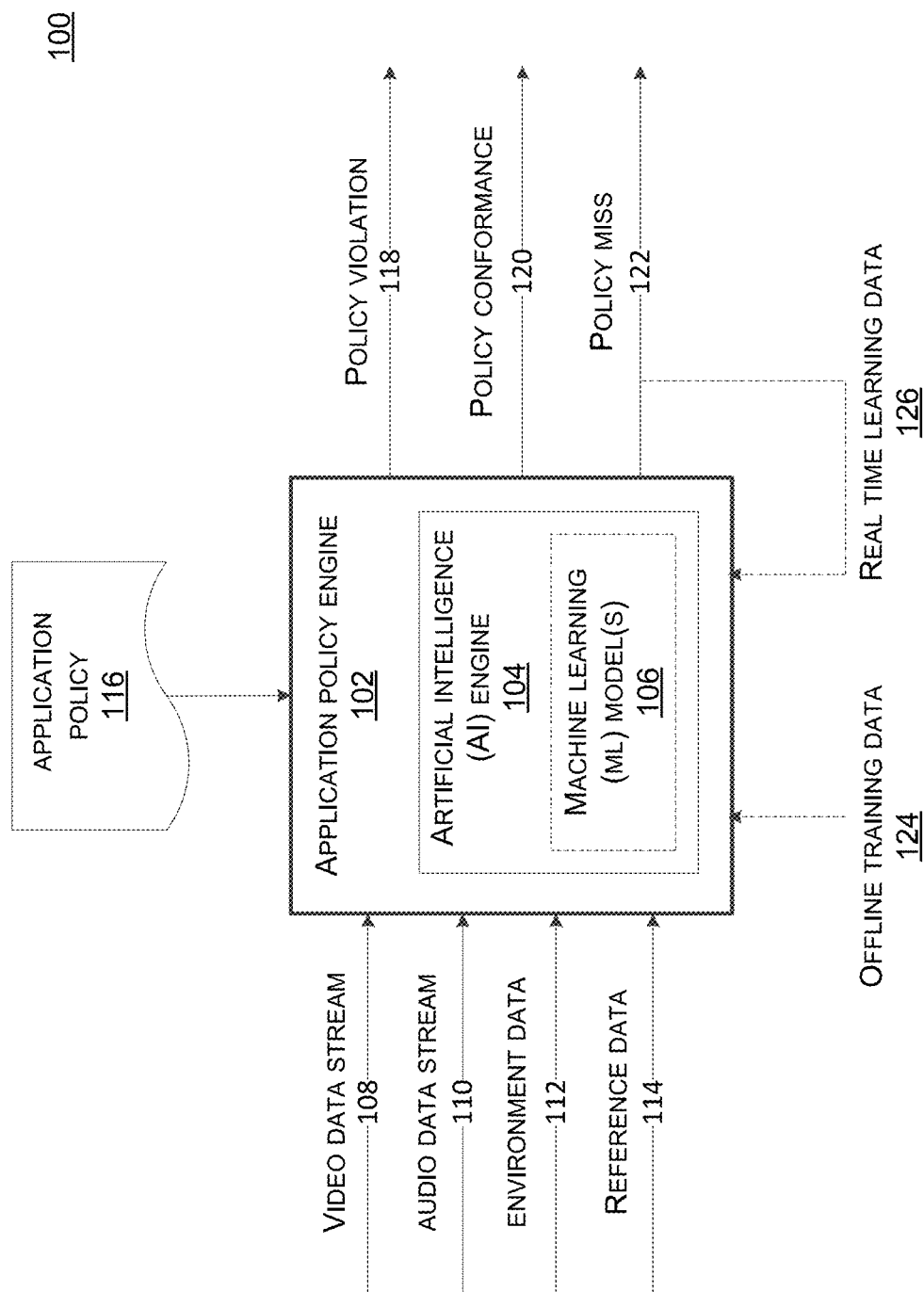
FIG. 1 illustrates a high level diagram of a computer system comprising an application policy engine which can be used to generate a recommendation for an action based on an application policy, in certain embodiments.

The following description of the embodiments disclosed herein is not to be limited in scope by the specific embodiments described herein. Various modifications of the embodiments of the present disclosure, in addition to those described herein, will be apparent to those of ordinary skill in the art from the foregoing description and accompanying drawings. Further, although some of the embodiments of the present disclosure have been described in the context of a particular implementation in a particular environment for a particular purpose, those of ordinary skill in the art will recognize that its usefulness is not limited thereto and that the embodiments of the present disclosure can be beneficially implemented in any number of environments for any number of purposes with or without any modifications.

In some instances, a law enforcement officer may have to make a split second decision about using lethal force without having access to all the necessary information about a suspect or an incident, or without having enough time to make a thoughtful decision. In some cases, the law enforcement officer may make an emotionally biased decision based on preconceived notions about race, skin color, gender, social status, ethnicity etc. It is also possible for the connection to a law enforcement command center to be down or not available, or the law enforcement officer may not have additional on-site support. In some other instances, the law enforcement command center may make a decision on behalf of the law enforcement officer without having all the real time information about the suspect or the incident. Therefore, some situations may result in an undesirable outcome, e.g., injury or loss of life of an innocent individual or the law enforcement officer, or other monetary damages.

Certain embodiments can rely on artificial intelligence to detect a threat automatically and locally using real time input data and relevant metadata to provide a recommendation for an action based on an application policy, thus eliminating dependency on erroneous human decisions resulting from biases, emotions, insufficient time or information. The application policy can include different rules and corresponding recommended actions which can be configured based on the application. The application policy may be associated with an organization, e.g., a law enforcement organization, department of motor vehicles (DMV), a business organization, a government organization, an institute, a corporation, or another suitable entity.

Artificial intelligence (AI) uses self-learning algorithms to train machines to perform certain tasks generally performed by a human brain. AI may find its applications in healthcare, e-commerce, finance, social media, education, law enforcement, transportation, sports, defense, entertainment, manufacturing, and government organizations, to name a few. The AI algorithms may be based on one or more of deep learning, neural networks, regression, machine learning, clustering, classification, supervised learning, unsupervised learning, re-enforcement learning, and dimensionality reduction, among others. Machine learning is a specific subset of AI that can train a machine on how to learn using machine learning models. Machine learning models can learn from a given dataset (e.g., training dataset) by identifying and analyzing patterns in the data and draw conclusions similar to a human brain. Once the AI algorithm gets trained at drawing conclusions it can apply that knowledge to a new dataset to make a prediction. The repetitive learning from using the training dataset in addition to the feedback data collected during the learning process can improve the AI algorithm resulting in increased accuracy in the performance. Some non-limiting examples of the machines can include computers, robots, equipment, apparatus, hardware, devices, systems, etc.

Certain embodiments can use an application policy engine to automatically and autonomously detect threat for various applications associated with an organization based on their respective application policies. The application policy engine may include an AI engine configured to execute one or more machine learning (ML) models that may have been trained with datasets associated with different applications. Knowledge from the trained ML models can be used to infer results which can be used by the application policy engine to provide the corresponding recommended action as per the rules in the application policy.

The application policy engine may be capable to receive a real time input data stream comprising a real time video data stream or an audio data stream. The application policy engine may also be capable to receive metadata comprising reference data associated with a subject, or environment data. The environment data may include location specific data associated with a location of the subject and application specific data based on the application. The subject may be a human. Various portions of the metadata can be received from different sources. For example, the reference data can be fetched from cloud based on an identifier associated with the subject. The cloud can be a private cloud, an enterprise cloud, or a hybrid cloud associated with the organization. The identifier can be determined using the real time video or audio data stream (e.g., face recognition, voice recognition, iris scan, retina scan, vehicle registration number, etc.). In certain implementations, the identifier can be determined using the subject's driver's license (DL) number, social security number (SSN), date of birth (DOB), phone number, employee identifier (ID), or fingerprints, among others. The environment data can be obtained from a command center or a control center associated with the organization. In certain embodiments, the environment data can be obtained directly from external entities (e.g., government agencies, various websites, etc.) using a network interface and appropriate application programming interfaces (APIs).

The metadata may also comprise one or more ML models to be executed by the application policy engine. In certain embodiments, the one or more ML models may include a generic ML model which may have been trained using offline training data associated with various differentiating physical and behavioral characteristics of humans, e.g., facial expressions (e.g., calm, fear, anger, regret, frustration, or excitement), tone (e.g., angry, threatening, soft, anxious, or loud), emotions (e.g., crying, sobbing, screaming, pleading, or apologetic), body language or movements (e.g., hands in the air, pointing a weapon, holding an object), among others. The application policy engine may execute the generic ML model to infer biometric characteristics of the subject given the real time input data stream. For example, the generic ML model may be used to infer anger, a threatening tone, or a weapon in subject's possession using the real time input data stream. The generic ML models can be different for different genders, races, ethnicity, age groups, etc., to enable proper inferencing of the biometric characteristics of humans. The application policy engine may use the inferred results to determine policy conformance, or to identify a threatening or a non-threatening situation.

In certain embodiments, a baseline reference ML model may be used instead of the generic ML model to increase prediction accuracy based on a baseline profile of the subject. The baseline profile may include baseline biometric characteristics of the subject. As an example, any policy enforcing organization (e.g., DMV) may record, store, or have access to the baseline profile of each driver's license (DL) holder. In certain applications, the baseline profile may include physical and behavioral characteristics of the subject to perform a task. For example, the baseline profile may include a photo of the subject, eye color, hair color, height, weight, age, video recordings of certain body movements or motions (e.g., walk and turn test for DUI), audio recordings for certain predetermined phrases (e.g., "my name is John Doe", "I was born on ninth September nineteen ninety nine", etc.), or any other relevant data related to performing certain tasks. The baseline reference ML model can be trained using data associated with the baseline profile of the subject. When the system is engaged, the baseline profile and the baseline reference ML model associated with the subject may be fetched from the cloud as part of the metadata based on the identifier. The baseline reference ML model can be used to infer facial expressions, tone, emotions, body language or movement, or other biometric characteristics more accurately from the real time input data stream based on the deviation from the subject's baseline biometric characteristics. In instances, when the baseline reference ML model is not available, the application policy engine may infer biometric characteristics associated with the subject using the generic ML model.

In certain instances, the baseline reference ML model may be used to identify whether the subject is under the influence of alcohol or drugs. The subject may be asked to perform the same task specified in the baseline profile of the subject and can be captured by the real time input data stream. For example, the subject may be asked to perform the same body movements or motions, or speak the same predetermined phrases as stored in their baseline profile. The application policy engine can use the baseline reference ML model to identify if the subject was driving under the influence of alcohol or drugs based on the deviation in the inferred biometric characteristics of the subject from their baseline biometric characteristics. The baseline reference ML model can also help detect if the subject is using a fake or stolen identity since the identity of the subject cannot be confirmed based on the baseline profile retrieved from the cloud.

The application policy engine may be further configured to determine whether the application policy was violated, conformed to, or missed based on a correlation between the metadata and the inferred results. The metadata may include the reference data or the environment data. The correlation results can be compared against a policy threshold to determine whether the application policy was violated, conformed to, or missed, and a corresponding recommendation as specified by the application policy may be provided. In certain embodiments, each of the reference data, environment data and the inferred results can be weighted with respective configurable values based on the application intent before comparing against the policy threshold.

In certain examples, for an application involving the law enforcement, the application policy engine can be part of a device accessible to the law enforcement officer. The device may also include a camera, an audio device, etc. to receive a live video or audio data stream. The live video or audio data stream can be received continuously or for an incident. In certain examples, the incident can include an interrogation, event, traffic violation, driving under influence, accident, robbery, kidnapping, homicide, or any other activity. In certain embodiments, the device can be installed on a building or a traffic light. Multiple such devices can be used at various locations to perform threat detection automatically using real time input data which may not be generally feasible without having a presence of large law enforcement.

As an example, a recommendation for an action may include using or refraining from using a lethal force if the application policy was violated. In some instances, the recommendation for the action may include locking a firearm accessible to the law enforcement officer. In some examples, a verbal warning may be given based on the action, or an action may be performed (e.g., use or activation of a firearm). Information associated with the incident may be logged in memory locally or remotely as per auditing/forensic specification. In some instances, the auditing or forensic specification may be part of the application policy.

If the policy conformance has occurred, no action may be taken. At a minimum, incident data may be logged in the memory for reference. If the policy miss has occurred, the incident data may be logged in the memory for reference. Additionally, data associated with the incident may be used as a learning dataset to further train the ML model(s). The application policy engine may also be capable to support dynamic software updates in real time using hot patching without impacting its basic functionality. In certain embodiments, a portion of the ML model can be reserved or made available for patching in real time. For example, when a policy miss occurs due to missing data (e.g., subject's phone number), wrong data (e.g., misspelled name), or another fixable error, the portion of the ML model can be patched in real time to fix the error and another recommendation can be generated using the new predictions from the patched ML model.

In certain examples, if a threat is detected based upon the policy violation, the recommended action may include generating an alarm or another form of warning, activating an emergency system, or shutting down a system to prevent an undesirable outcome. The recommendation for the action can be communicated to a peripheral device via an API. For example, the recommendation can be displayed on a screen as a text message or an image, or can be played using a voice message on a speaker. In certain examples, the device can vibrate, or play different audio tones based on the recommendation. The display screen or the speaker may be part of the device or external to the device. In some examples, smart lights (e.g., flashing lights, with or without sound) can be used to indicate an alarm, a warning or a system shutdown.

In certain examples, the action recommended by the application policy engine may be overridden or ignored by the user of the device or the command center. For example, the action may not be performed or a different action may be performed. Generally, deep evaluation of an action for an incident is performed after the action has happened as part of post-mortem and investigative proceedings following the incident/encounter. However, certain embodiments can help move deep evaluation aspect of the action to the pre-stage from post, which can provide accountability. For example, if the law enforcement officer ignores AI recommendation thus leading to a loss of life, injury, or another undesirable outcome, the law enforcement officer can be held accountable. In certain embodiments, the action taken by the law enforcement officer (e.g., recommended or overridden) can be logged along with the officer's name, badge number, and any other information associated with the officer or the incident for future proceedings.

In some applications associated with a business organization, an injury or a threat to a worker's life may be caused while performing a task for an application associated with the business organization. Some non-limiting examples of the task may include handling or operating machinery, loading or unloading objects, assembly line operations, or construction related tasks. The injury or the threat may be caused by a machine malfunction, human carelessness, mishandling of the machinery, worn out equipment, or physical or mental state of the worker, among others. Certain embodiments can be used to perform automated threat detection and evaluation for the worker's safety for various applications associated with the business organization. The business organization may include manufacturing companies, warehouses, factories, fulfilment centers, construction companies, or other companies providing goods or services. The application policy may be defined by the business organization, the machinery manufacturer, the labor laws, or a combination thereof.

An ML model can be trained using offline training data associated with performing a task in compliance with safety guidelines for a specific application. In certain embodiments, the offline training data may be used to train a baseline reference ML model using a baseline profile of the worker for more accurate predictions. The baseline reference ML model for the worker can be used to detect a physical threat to the worker while performing the task based on a violation of the safety procedures using the application policy and the real time input data stream. The application policy engine can be part of the machinery, an apparatus that may be present in the vicinity of the machinery, or a device worn by the worker. In certain embodiments, the application policy engine can generate an alert or shut down the system to avoid an accident upon determining that the application policy was violated. For example, the application policy may be violated for an incident related to an incorrect use of the machinery, mishandling of the objects at an assembly line, malfunctioning of the machinery, operational error, suboptimal physical or mental state of the worker, extreme weather, or human error among others. The application policy engine may also be coupled to components capable of communicating the alert to a supervisor or other personnel, a control center, or another entity.

Certain embodiments can use the application policy engine to perform automated threat detection and evaluation using various ML models given the real time input data streams and the metadata, and provide a corresponding recommended action based on an application policy. Performing the recommendation actions in place of the erroneous human actions can avoid injuries, loss of lives or monetary damages for different applications associated with an organization.

FIG. 1 illustrates a high level diagram of a computer system 100 comprising an application policy engine 102 which can be used to provide a recommendation for an action based on an application policy 116, in certain embodiments. The computer system 100 may be an embedded computer system. For example, the application policy engine 102 may be part of a device, an apparatus, a computer, machinery, or any suitable system. In some implementations, the application policy engine 102 can be part of an Internet of Things (IoT) device. The application policy engine 102 can be implemented using integrated circuits, field programmable gate array (FPGA), system on a chip (SoC), system in a package (SiP), application specific integrated circuits (ASICs), etc.

The application policy engine 102 may comprise an AI engine 104 in addition to other components which are not shown here for the ease of simplicity. For example, the application policy engine 102 may also include one or more processors, memory, accelerators, input interface(s), output interface(s), network connectivity, and other suitable components based on the application. The processor(s) may be configured to execute a program stored in a non-transitory computer readable medium, which may be part of the memory or an independent device. In certain implementations, the processors may be optimized for AI applications. The AI engine 104 may be configured to execute one or more machine learning (ML) models 106 that may be based on a respective trained machine learning algorithm. The machine learning algorithms may be based on one or more of deep learning, neural networks, regression, clustering, classification, supervised learning, un-supervised learning, re-enforcement learning, and dimensionality reduction, among others. As an example, the ML models 106 may be based on a convolutional neural network, a feed forward neural network, a recurrent neural network, or another suitable neural network. In certain embodiments, the ML models 106 may include one or more of a generic ML model to infer biometric characteristics of individuals, a baseline reference ML model to infer biometric characteristics associated with a subject, or dedicated ML models for specific purposes.

The computer system 100 may also have access to a private cloud or a semi-private cloud associated with the organization to provide back-end computing and storage resources. For example, the cloud may provide storage memory to store profile information of the individuals, reference data associated with the individuals, location specific data (e.g., crime rate for specific locations, sex offenders living in specific locations, etc.), application specific data (e.g., criminal records, DUI records, etc.), application policies, ML models, historical data associated with the application, or any other relevant data associated with the organization. The computer system 100 may be configured to communicate with a remote server computer to receive the metadata using a network interface. The remote server computer may be associated with the cloud, a command center, control room, a government organization, or another authorized entity. The computer system 100 may communicate with the remote server computer using any suitable network protocol (e.g., cellular, WiFi, Bluetooth, Transmission Control Protocol/Internet Protocol (TCP/IP), Ethernet, radio, etc.).

The application policy engine 102 may be configured to receive one or more of video data stream 108, audio data stream 110, environment data 112, and reference data 114. In certain embodiments, one or more of the video data stream 108, audio data stream 110, environment data 112, and the reference data 114 may be received in real time to determine the policy conformance for an application based on the application policy 116. The application policy 116 may be configured to include various rules and corresponding recommended actions specific to the application. In certain embodiments, the video data stream 108 and the audio data stream 110 can be received using a camera interface. In other embodiments, the video data stream 108 and the audio data stream 110 can be received using a network interface from other sources (e.g., other cameras external to the computer system 100). The metadata comprising the environment data 112, reference data 114, or appropriate ML models can be received from the cloud, command center, control center, or another authorized entity using a network interface. The environment data 112 may comprise location specific data and application specific data. In certain embodiments, various portions of the metadata can be received from different sources. For example, a portion of the metadata can be obtained from external entities (e.g., DMV, www(dot)weather(dot)gov, social security office, amberalert(dot)ojp(dot)gov, federal bureau of investigation (FBI), department of justice (DoJ), local county or state agencies, or other suitable organizations). In certain embodiments, the computer system 100 may be capable to obtain a portion of the metadata directly from the external entities using the network interface and respective APIs.

In certain examples, the application policy engine 102 can be part of a device belonging to a law enforcement officer who may be near a subject (e.g., human). The law enforcement officer may be interrogating the subject or may have become aware of the subject's presence. The subject may be inside or outside a vehicle. The law enforcement officer may desire to determine whether the vehicle is a stolen vehicle. The location specific data may include any data associated with the location of the subject (e.g., crime rate in the area, recent criminal activities, open warrants, current weather, etc.). In certain examples, the subject, or a passenger in the vehicle may be a kidnapped victim or a missing person. The application specific data may include any data associated with the missing persons, or kidnapped victims. The reference data 114 may include any metadata associated with the subject (e.g., criminal background, race, ethnicity, citizenship, family history, employment history, medical history, residential history, registered firearms, registered vehicles, drive record, etc.).

In certain examples, the computer system 100 can be used to automatically detect a threat to a worker's safety while performing a task for an application associated with a business organization. For example, the application policy engine 102 can be part of machinery, a device that may be present in the vicinity of the machinery or worn by the worker while performing the task. The application policy 116 may be defined by the business organization, the machinery manufacturer, the labor law, or a combination thereof. The real time video data stream 108 or the audio data stream 110 may include video or audio data stream of the worker performing the task. The task may be performed indoors or outdoors. For example, the task may include operating or handling machinery, loading or unloading objects, or assembling objects, among others. The cloud, command center, or the control room may be associated with the business organization. The metadata associated with the workers and the machinery may be stored in the cloud associated with the business organization. In certain embodiments, a portion of the metadata can be directly received from the machinery manufacturer or a third party using a suitable API. The reference data 114 may include the worker's personal information (e.g., age, build, medical history, etc.), historical data associated with the worker to perform the tasks related to the application (e.g., experience level), employment history (e.g., employee ID, number of years on the job, etc.), work ethics, or previous accidents, etc. The environment data 112 may include operating conditions of the machinery (e.g., worn out, new, acceptable, unpredictable, intermittent function, etc.), object characteristics (e.g., heavy, light, slippery, easy grip, difficult grip, odd shaped, etc.), current weather (e.g., hot, raining, cold, humid, etc.), or any known issues with the machinery, among others. The ML models 106 may have been trained with the offline training data associated with performing the task using safety guidelines and any other suitable criteria based on the application.

The AI engine 104 may be implemented in software, hardware, or a combination thereof. In certain implementations, accelerator functionality may be integrated with the AI engine 104 to speed up certain specific functionalities. The accelerator(s) may include microprocessor(s), graphical processing units (GPUs), coprocessor(s), or other suitable circuits. In one example, specific accelerators may be used for low precision arithmetic, in-memory computing capability, or other data intensive tasks. In other examples, parallel computing, memory arrays, or specific architectures may be used by the application policy engine 102 to accelerate certain computations related to the AI engine 104. In certain examples, acceleration may be provided in software with or without hardware acceleration.

In certain embodiments, the computer system 100 may utilize an AI platform designed for AI applications, or which can support deep learning frameworks like TensorFlow®, Pytorch®, or PaddlePaddle®, among others. For example, the application policy engine 102 may be configured to execute different ML models for different applications, which may have been trained using a suitable AI platform.

In certain embodiments, the AI engine 104 may include dedicated and high performance accelerator(s) with high throughput for inference operations which can improve the performance of the application policy engine 102. In certain embodiments, the AI engine 104 may include neural network processor(s) optimized for hardware-intensive processing performed using the ML models 106. In certain embodiments, the AI engine 104 may include GPUs or processors with built-in AI acceleration which can handle AI workloads for applications like image classification, speech processing, object detection, segmentation, and more. Some non-limiting examples of the AI accelerators may include Intel® Nervana™ Neural Network Processor, NVIDIA® Tesla GPU, among others. Knowledge from the trained ML models 106 can be used to infer results which can be used by the application policy engine 102 to provide the recommended actions based on the application policy 116. The application policy engine 102 may store a generic ML models locally which can be executed to infer biometric characteristics associated with a subject.

The application policy 116 may be configured to include various rules and corresponding recommended actions which can be configured based on the application associated with the organization. For example, for criminal activities like theft, robbery, homicide, misdemeanor, terrorism, kidnapping, rape, sexual assault, hate crime, etc., the application policy 116 may include rules and corresponding recommended actions in compliance with the law enforcement. In another example, for driving or traffic related incidents, the application policy 116 may include rules and corresponding recommended actions in compliance with the law enforcement, DMV, bureau of Alcohol, Tobacco, Firearms and Explosives (ATF), or other government organization. In another example, for applications involving workers, machinery, goods or chemicals, the application policy 116 may include rules and corresponding recommended actions in compliance with the associated business organization, the manufacturer of the machinery, safety and health regulations associated with the U.S. department of labor, local laws, or a combination thereof.

The application policy 116 may be stored using any appropriate data structure or format. A default application policy can be stored locally on the application policy engine 102 for quick access and an updated application policy can be downloaded as and when the network connectivity is available. In certain embodiments, each rule in the application policy 116 may correspond to a recommended action based on the correlation among a plurality of conditions. The correlation can be determined by performing logical operations between the conditions. The conditions may be based on the real time input data steam and the metadata. Each condition can also be weighted based on the application intent. The correlation result (e.g., outcome of the logical operations) can be compared against a policy threshold to determine whether the application policy has been violated, missed or conformed to. For example, a first recommended action may correspond to the policy violation, a second recommended action may correspond to the policy conformance, and a third recommended action may correspond to the policy miss.

In certain examples, the conditions may correspond to the environment data 112, reference data 114, and the inferred biometric characteristics. In certain embodiments, each condition can be weighted using a programmable value specific to the application. For example, if the first condition corresponds to the environment data 112, the second condition corresponds to the reference data 114, the third condition corresponds to a first inferred biometric characteristic (e.g., tone), and the fourth condition corresponds to a second inferred biometric characteristic (e.g., body language), the rule can be configured to have a 10% weightage on the first condition, a 20% weightage on the second condition, a 30% weightage on the third condition and a 40% weightage on the fourth condition. The correlation result can be determined by adding the weighted conditions, and can be compared with the policy threshold to determine whether the application policy 116 has been violated, missed or conformed to.

In certain embodiments, the application policy 116 may include multiple thresholds (e.g., a first level, second level, and a highest level) for different levels of policy violation and corresponding recommended actions. The application policy engine 102 can also provide a policy violation 118, a policy conformance 120, or a policy miss 122 based upon whether the application policy 116 has been violated, conformed to or missed respectively. The policy violation 118, policy conformance 120, or a policy miss 122 can be used to generate alerts, system shutdowns, warnings, or for other indications.

The ML models 106 may have been trained using offline training data 124. The offline training data 124 may include datasets based on the application. For example, for a law enforcement application, the offline training data 124 may include datasets associated with baseline biometric characteristics of individuals. In certain embodiments, the offline training data 124 may include data associated with a baseline profile of an individual which can be used to train a respective baseline reference ML model to increase prediction accuracy for incidents related to that individual. Real time learning data 126 may be associated with the policy miss 122 and can be used to further tune the ML models 106 for future applications. In certain embodiments, the ML models 106 can be trained by incorporating techniques like differential privacy and federated learning to preserve the privacy of individuals associated with the datasets. The ML models 106 can be trained based on supervised or unsupervised learning using any suitable AI platform. The application policy engine 102 can store the ML models 106 locally so that the predictions can be made with the real time input data without relying on the network connection. Training of the ML models 106 is discussed with reference to FIG. 2.

Figure 2:
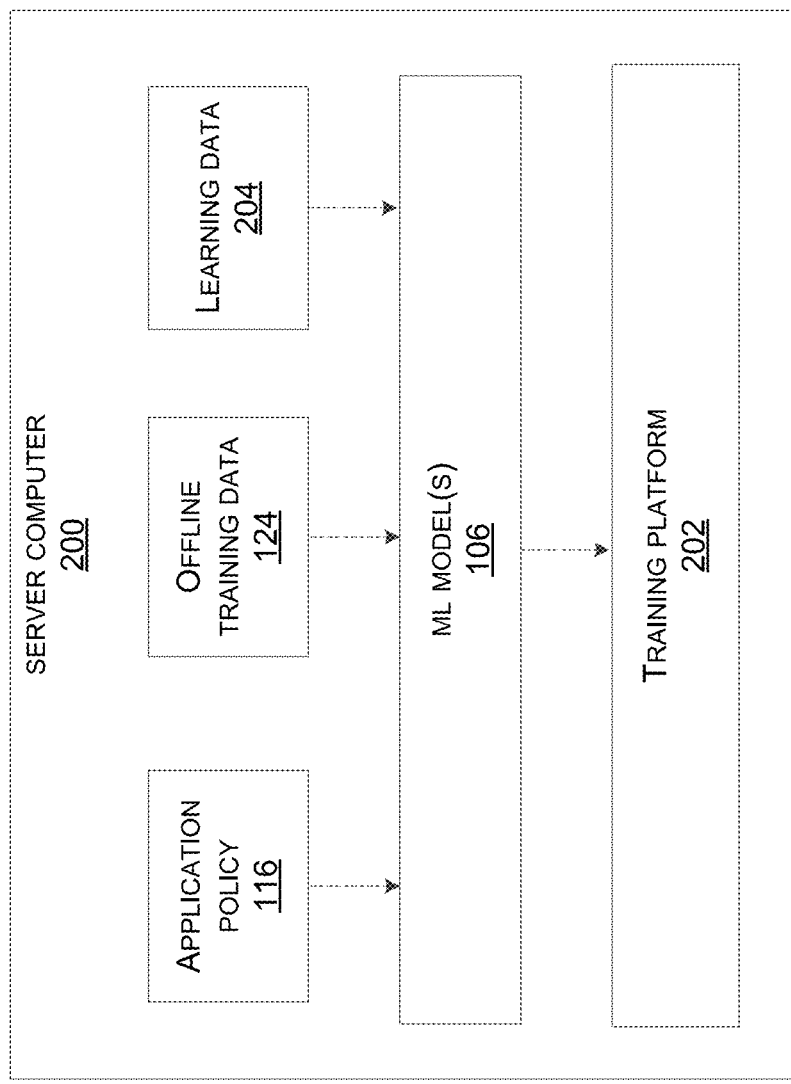
FIG. 2 illustrates a server computer which can be configured to train machine learning (ML) models in certain embodiments.

FIG. 2 illustrates a server computer 200 which can be configured to train the ML models 106 in certain embodiments.

The server computer 200 may provide a training platform 202 to train and tune the ML models 106 based on the application policy 116. The training platform 202 can be used to create one or more ML algorithms for the ML models 106 based on any suitable AI platform using the offline training data 124. As an example, the training platform 202 may include hardware components (e.g., processors, memory, GPUs, CPUs, FPGA, ASICs, SoCs, buses, controllers, or neural network processors, among others) to train the ML models 106 using any suitable software framework and tools. The processors can be configured to execute instructions to perform various tasks associated with training the ML models 106. In certain implementations, the server computer 200 may also include network connectivity (not shown). The network connectivity can be used to download the learning data 204 from the cloud or to download the offline training data 124 for training the ML models. In certain embodiments, the server computer 200 may utilize a Machine-Learning-Platform-as-a-Service (ML PaaS) to train and tune the ML models 106 using suitable APIs.

The offline training data 124 may include static data based on a specific application and can be obtained from various websites, organization(s) having access to relevant data associated with the specific application, or by other suitable means. In other examples, the offline training data 124 may include computer or manually generated data. In certain examples, the offline training data 124 may have been collected from various IoT devices connected over the Internet.

In one example, the offline training data 124 for a law enforcement application may include data associated with baseline biometric characteristics of individuals. For example, the offline training data 124 may include data associated with various differentiating physical and behavioral characteristics of humans. The physical and behavioral characteristics of humans may include different facial expressions (e.g., calm, fear, regret, anger, sadness, frustration, happy), emotions (e.g., crying, screaming, apologizing, threatening, joy, anxiety), tone (e.g., loud, angry, soft, mumbling, screaming, or threatening), body language or movements (e.g., hands up in the air, hands down to the sides, shaking, pleading, surrendering, walking, holding an object or a weapon), among others. In addition, the offline training data 124 may vary based on the gender, ethnicity, race, age group, or other differentiating criteria.

In certain embodiments, the offline training data 124 may also include data associated with a respective baseline profile of each individual based on the application, which can be used to train a respective baseline reference ML model 106 for future predictions associated with that individual. The baseline profile may include data associated with biometric characteristics of the individual, e.g., biometric data, video recordings of certain body movements or motions (e.g., related to sobriety test), audio recordings for certain predetermined phrases (e.g., "my name is John Doe", "I was born on ninth September nineteen ninety nine", etc.), and any other relevant data. In certain examples, any policy enforcing organization (e.g., DMV) or a government organization (e.g., social security administration) may record, store, or have access to a baseline profile of each individual (e.g., based on their DL number or SSN). The respective baseline profile or the reference ML model can be accessed using an identifier (e.g., DL number, SSN, DOB, vehicle registration number, vehicle identifier, biometric identifier, medical record number, etc.) associated with the individual.

In certain embodiments, the offline training data 124 may include datasets associated with certain individuals, which can be used to train a respective dedicated ML model. The certain individuals may include wanted criminals, parolees, sex offenders, gang members, terrorists, missing persons, or kidnapped victims, among others. For example, the dedicated ML model can be executed to identify the individuals using facial or voice recognition.

In certain embodiments, the offline training data 124 for a task related to an application for a business organization may include datasets associated with reference videos for performing the task by a worker in compliance with relevant safety guidelines. For example, the baseline profile of each worker may include data associated with baseline biometric characteristics of the worker, e.g., a photo or mugshot of the worker, facial expressions, body posture, or certain movements (e.g., operating or handling certain machinery or objects), among others. A baseline reference ML model associated with the worker can be trained using the offline training data 124, and can be used to infer facial expressions, body posture or certain movements of the worker associated with performing of the task.

The learning data 204 can be used to further tune the ML models 106 for more accurate predictions. In certain embodiments, the learning data 204 may include data associated with the summary of the previous incidents e.g., policy misses, previously recommended actions, type of incidents, and whether the actions were followed or overridden. For example, the learning data 204 may include real time learning data 126 associated with the policy misses which may be logged in respective summaries for previous incidents. The learning data 204 may be retrieved from the summaries archived on the cloud for each incident associated with an application.

The trained ML models 106 can be used to infer certain biometric characteristics associated with a subject given a new dataset. To infer using the ML model(s) 106 can imply making a prediction about the new dataset using the trained machine learning algorithm. In certain embodiments, as part of the training, different ML algorithms can be created which can be used to infer different biometric characteristics using the respective ML model 106. In one example, a first ML model may be trained for video inferencing, and another ML model may be trained for audio inferencing. In another example, a first ML model may be trained for inferencing facial features (or face recognition), a second ML model may be trained for inferencing tone (or voice recognition), a third ML model may be trained for inferencing body movements, a fourth ML model may be trained for inferencing emotions, and so on.

Referring back to FIG. 1, the application policy engine 102 may include functionality to generate an identifier based on information associated with a subject. For example, the identifier may correspond to one or more of a photo (e.g., mug shot) of the subject, DL number, SSN, phone number, DOB, photo of a vehicle belonging to the subject, vehicle registration number, or vehicle identification number, among others. The information associated with the subject may be determined based on the real time input data stream or data provided via a user interface. In one example, the application policy engine 102 may utilize dedicated face or voice recognition models to generate the identifier using the real time input data stream. In another example, the application policy engine 102 may include functionality to generate the identifier based on iris scan, retina scan, fingerprints, or other biometric identifier of the subject. For example, the iris scan, retina scan, fingerprinting, etc. can be performed using an iris scanner, retina scanner, fingerprinting device, or another appropriate device. In another example, the information associated with the subject may be entered using a suitable external interface e.g., a keypad, touch screen, microphone, among others, which can be used to generate the identifier. The identifier can be used to fetch the metadata from the cloud, command center, control center, or other external entities. For example, the identifier can be used to fetch the reference data 114 or baseline reference ML model from the cloud. In certain embodiments, the identifier may be used to fetch a portion of the reference data 114 directly from the external entities using appropriate APIs. For example, the drive record of the subject can be fetched from the DMV (e.g. using the DL number), the medical record of the subject can be fetched from an organization keeping medical records (e.g., using the SSN or a medical ID), or the criminal record of the subject can be fetched from the NCSC (e.g., using the SSN or a photo), among others.

The application policy engine 102 may use the one or more ML models 106 to process the real time input data stream (e.g., the video data stream 108 or the audio data stream 110) to infer biometric characteristics of the subject.

In one example, for the law enforcement application, the application policy engine 102 may use the ML model(s) 106 to infer facial expressions (e.g., calm, fear, regret, anger, sadness, happy), emotions (e.g., crying, screaming, apologizing, threatening, joy, or anxiety), tone (e.g., loud, angry, soft, mumbling, screaming, or threatening), body language or movements (e.g., hands up in the air, shaking, pleading, surrendering, walking, holding an object or a weapon), which can be used to identify a threatening or a non-threatening situation. In another example, the application policy engine 102 may use the baseline reference ML model associated with the subject for more accurate predictions related to the subject, or to infer biometric characteristics specific to the subject's profile (e.g., certain body movements or speech) to determine whether the subject is under the influence.

In another example, the application policy 116 may be associated with an application for a business organization. For example, the application may include performing a task (e.g., operating a machinery) by a worker associated with the business organization (e.g., an employee or a contractor). The application policy engine 102 may use the ML model(s) 106 to infer facial expressions (e.g., tired, sleepy, awake, alert), body posture (e.g., upright, bent), or certain movements specific to performing the task, which can be used to identify a threat to the worker's safety or whether the safety guidelines are being followed.

The application policy engine 102 can determine a correlation between the metadata and the inferred biometric characteristics, and can assert the policy violation 118, policy conformance 120, or the policy miss 122 accordingly based on the application policy 116. The metadata may include the reference data 114 or the environment data 114. In some instances, the policy violation 118 may be used by the computer system 100 to detect a threat and generate an alert, a warning, an alarm, a system shutdown or another suitable indicator to indicate that the policy was violated. The policy conformance 120 may be used to indicate that no threat was detected and therefore no action may be needed. The policy miss 122 may be used to indicate that there was not enough information to make a proper prediction thus the metadata may need to be updated. The policy violation 118, policy conformance 120, and the policy miss 122 can also be used by the associated organization to update the application policies, or for archival purposes.

In certain embodiments, the policy miss 122 can be used to generate real time learning data 126 based on the application policy 116, which can be used by the application policy engine 102 to patch the ML model 106 in real time for more accurate predictions. For example, a certain portion of the memory for the ML model 106 can be reserved for patching in real time. The application policy engine 102 may be configured to perform patching when the policy miss 122 is detected and generate the recommendation again using the patched ML model 106. In certain examples, the patching data can be provided via the user interface.

The policy violation 118, policy conformance 120, and the policy miss 122 may be represented using one or more signals (electrical, audio, video, etc.), or LEDs. In various examples, the policy violation 118, policy conformance 120, or the policy miss 122 can be represented using different colors of LED lights, different sound alarms, different audio tones, vibrations, a display screen, or another suitable form. For example, the policy violation 118 can be represented using a flashing red LED, the policy conformance 120 can be represented using a green light, and the policy miss 122 can be represented using a yellow light. The color of LED lights, type of sound alarms, type of audio tones, type of vibrations, texts or images on the display screen, etc. can be programmed to have different values for different outcomes.

In certain examples, the type of action recommended may vary based on a level or range of policy violation 118. For example, a less severe policy violation (e.g., traffic violation) may have a less severe recommended action (e.g., issuing a speeding ticket or a warning), and a more severe policy violation (e.g., driving under the influence) may have a more severe recommended action (e.g., suspending the driver's license of the subject). Some non-limiting examples of the recommended action may include using a firearm, refraining from using a firearm, arresting (e.g., hand cuffing) the subject, a verbal warning, issuing a traffic violation ticket, issuing a warrant, etc., based on the level of policy violation.

In another example, for the application related to the business organization, a less severe policy violation (e.g., tired, incorrect body posture) may have a less severe recommended action (e.g., warning), and a more severe policy violation (e.g., sleepy, incorrect body movements, incorrect use of machinery,) may have a more severe recommended action (e.g., attending a training, suspension). Some non-limiting examples of the recommended action may include generating an alarm, system shutdown, etc., based on the level of policy violation.

A summary comprising information associated with the incident may be logged in the cloud for reference and archival. The summary may include whether the application policy was violated, conformed to or missed, the recommended action, action performed, information associated with the subject, incident details (e.g., date and time of the incident, location, involved individuals, injuries, etc.), device identifier, and any other relevant details about the incident (e.g., damage at the location). Logging the action may also be beneficial for any possible future proceedings in case the recommended action is ignored or overridden by the law enforcement officer, the command center, the worker, or any other involved entity. Thus, the use of AI for certain applications can avoid undesirable outcomes resulting from erroneous human actions. In certain instances, undesirable outcomes or accidents can be avoided by using the application policy engine 102 proactively. This is further discussed with an example use case in FIG. 3.

Figure 3:
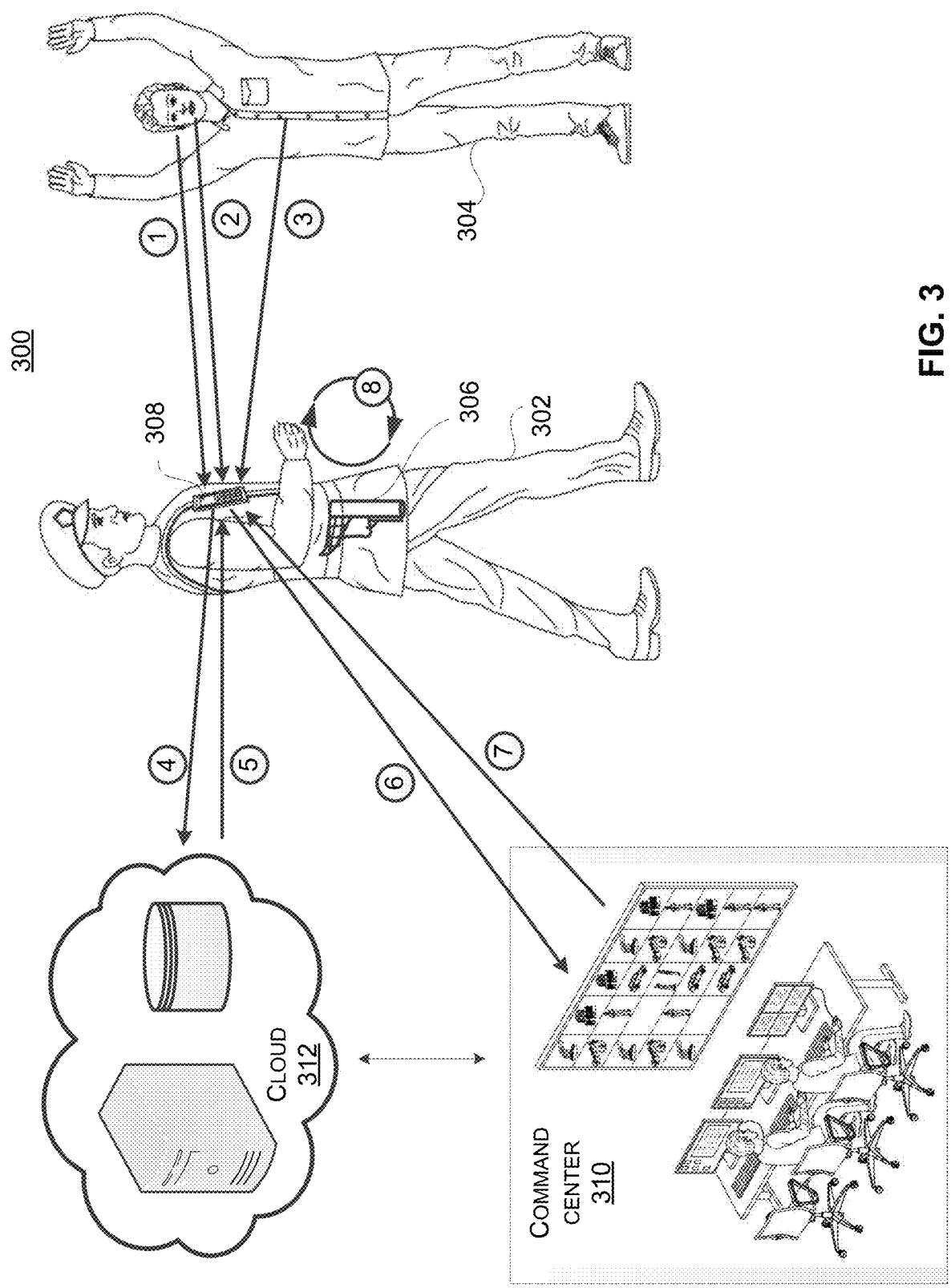
FIG. 3 illustrates an example use case for automated threat detection and evaluation using an application policy engine according to certain embodiments.

FIG. 3 illustrates an example use case 300 for automatic threat detection and evaluation using an application policy engine according to certain embodiments.

In some instances, a law enforcement officer 302 may want to interrogate a subject 304. The subject 304 may be an individual (e.g., a human). In some examples, the subject 304 may have been driving a vehicle prior to the interrogation, sitting in a vehicle, or standing outside the vehicle. In other examples, the subject 304 may be standing, walking, sitting, or engaged in another activity. The law enforcement officer 302 may want to interrogate the subject 304 with or without suspicion of a crime, for an unlawful behavior or activity associated with the subject 304 or the location of the subject 304, or for another incident. For example, the subject 304 may have been driving a vehicle recklessly, over the speed limit, while under the influence of alcohol or drugs, that has been stolen, with an expired vehicle registration, or without following the law. In other examples, the law enforcement officer 302 may want to interrogate the subject 304 because of a previous criminal activity associated with the subject 304. In some other examples, the subject 304 or a vehicle associated with the subject 304 may be in the possession of firearms, drugs, stolen items, a kidnapped victim, a missing person, or any other object that the subject 304 may be possessing illegally.

The law enforcement officer 302 may be a human, a robot, or a machine. The law enforcement officer 302 may be capable of communicating with the subject 304 using any suitable medium, e.g., audio (voice), video, or sign language. In certain embodiments, the law enforcement officer 302 may be a robot and may use a set of questions for interrogating the subject 304. The set of questions may be predetermined or can be determined in real time using an ML model based on the application. In certain embodiments, the ML models 106 may include a dedicated ML model which may have been trained using a suitable training dataset to infer a set of questions that can be asked the subject 304 based on the type of the incident, the real time inputs, profile of the subject 304, or location of the incident, among others. Such dedicated ML model can be trained using the training platform 202 in FIG. 2.

The law enforcement officer 302 may carry a firearm 306. In some instances, the law enforcement officer 302 may be pointing the firearm 306 towards the subject 304. In some other instances, the firearm 306 may not be visible to the subject 304. The firearm 306 may be any automatic or semi-automatic gun, rifle, pistol, knife, or another weapon the law enforcement officer 302 may be authorized to carry. In certain examples, the law enforcement officer 302 may carry a laser gun or a stun gun (not shown) in addition to the firearm 306. The firearm 306 may include components to disable its firing functionality locally or via remote access. In certain embodiments, the firearm 306 may include network connectivity to receive commands remotely for firing, locking or disabling the firearm 306.

The law enforcement officer 302 may carry a device 308 which can utilize AI to provide a recommendation for an action based on an application policy. Note that FIG. 3 illustrates the device 308 worn by the law enforcement officer 302, however it will be understood that the device 308 can be placed in any suitable location accessible or visible to the law enforcement officer 302, e.g., internal or external to the law enforcement officer 302's vehicle. The device 308 may be able to capture the real time input data stream associated with the subject 304 and his surroundings. The device 308 may comprise an embedded computer system comprising the application policy engine 102 from FIG. 1. The device 308 may be capable to communicate with a cloud 312 or a command center 310 using a network interface. The device 308 can be a phone, watch, radio, mobile data terminal, personal data assistant, mobile device, hand held computer, body camera, or another communication device.

The device 308 may include one or more of a video interface (e.g., camera), an audio interface (e.g., microphone, speaker, etc.), a location detector (e.g., GPS), a network interface, a radio interface for communication over certain frequencies, a display unit, a keypad, or other suitable components. The device 308 may optionally include one or more of sensors, buttons, switches, antenna, smoke detector, gas leak detector, multi-gas detector, explosives trace detector, explosives vapor detector, or any other suitable component based on the application. In certain embodiments, one or more components may be external to the device 308 and communicatively coupled to the device 308. Some of the components may be accessible using corresponding APIs. The device 308 may also include corresponding input, output, and network interfaces for communication with the cloud 312, the command center 310, the law enforcement officer 302, firearm 306, and any external entities. In certain implementations, the device 308 or certain functionality or components of the device 308 may be part of the firearm 306. In some other implementations, certain functionality or components of the device 308 may be part of another device (e.g., body camera, radio, mobile data terminal, etc.) accessible to the law enforcement officer 302 and coupled to the device 308.

In some examples, the video data stream 108 received by the application policy engine 102 may include real time video data stream from one or more cameras present at the location of the subject 304, e.g., a camera in the device 308, a phone camera or body camera belonging to the law enforcement officer 302 or another law enforcement officer present on-site, a camera installed on the law enforcement officer 302's vehicle, or other cameras having network connectivity that are located in the vicinity of the subject 304. The audio data stream 110 received by the application policy engine 102 may include audio data associated with the voice of the subject 304, the law enforcement officer 302, background noise (e.g., traffic noise, vehicle noise, music, etc.), or from other entities present on-site or off-site (e.g., other individuals present on-site, radio communication from the command center 310, etc.). The video data stream 108 and the audio data stream 110 may be part of the same data stream or different data streams. The application policy engine 102 may be capable to differentiate the voice of the subject 304 from other audio data.

The cloud 312 may be a private cloud, an enterprise cloud, or a hybrid cloud associated with the law enforcement organization. As an example, the cloud 312 may be configured to provide storage and computing resources for applications associated with the law enforcement organization. The cloud 312 may be managed internally or by a third party, and may be hosted internally or externally. The cloud 312 may include database(s) storing reference data comprising personal information associated with individuals. Some non-limiting examples of the personal information may include name, address, phone number, DOB, SSN, DL number, biometric data (e.g., a mug shot, eye color, hair color, height, weight, age, etc.), criminal background, employment background, social media accounts, family background, race, ethnicity, citizenship, residential history, firearms ownership, vehicles ownership, credit history, driver record, and medical history (e.g., mental illness, disability, chronic illnesses, drug addiction, alcohol addiction, trauma, etc.) among others. The database(s) may be implemented using any suitable data structure and can be accessed using a respective identifier associated with each individual. The databases can be implemented by incorporating techniques like differential privacy and federated learning to preserve the privacy of the individuals. In certain embodiments, the cloud 312 may also store summaries of various incidents.

The cloud 312 may also include databases to store the ML models 106 which can be used to make predictions. For example, a generic ML model can be used to predict biometric characteristics associated with the subject 304. In another example, dedicated ML models can be used for video inferencing or audio inferencing. Alternatively, dedicated ML models can be used for facial recognition, tone detection, emotions detection, or body language detection.

In certain embodiments, the cloud 312 may also include database(s) to store baseline reference ML models of individuals in addition to their personal profiles for more accurate predictions. As an example, any policy enforcing organization (e.g., DMV) or a government organization (e.g., social security administration) may record, store, or have access to a baseline profile of each individual. The baseline profile may include the biometric data, video recordings of certain body movements or motions (e.g., related to sobriety test for DUI), audio recordings for certain predetermined phrases (e.g., "my name is John Doe", "I was born on ninth September nineteen ninety nine", etc.), or any other relevant data associated with the individual. The baseline profile of the subject 304 can be stored as part of the reference data 114 associated with the subject 304. The baseline reference ML model for the subject 304 may be used to increase prediction accuracy when possible or to detect identity theft. Different ML models may be trained as discussed with reference to FIG. 2. In certain examples, the reference data 114, the baseline reference ML model (if available) associated with the subject 304, and any other ML models can be downloaded as part of the metadata as soon as the subject 304 is identified using an identifier. The identifier can be provided by the device 308 or can be generated by the cloud 312. The cloud databases can be designed to minimize the access time by allowing parallel searches for the reference data and the ML models or using other techniques.

The command center 310 can be the law enforcement command and control center, a dispatch center, a police or fire department, a control center, or another similar entity associated with the law or authorized on behalf of the law enforcement (e.g., contractors). The command center 310 may have access to computers, servers, or other suitable components capable of communicating with the device 308 or the cloud 312 using one or more suitable communication interfaces, e.g., cellular, radio, TCP/IP, Ethernet, Wi-Fi, etc. Note that the command center 310 as shown in FIG. 3 is for illustrative purposes only and any variation of the command center 310 is possible without deviating from the scope of the disclosure. For example, the command center 310 may include a computer or a robot capable of interacting with the device 308 or the law enforcement officer 302 using voice commands, video, texting, or another suitable method. The computer or robot may also include components (e.g., a display monitor, a camera, a speaker, a microphone, a keyboard, etc.) or functionality for interacting with the law enforcement officer 302. The command center 310 may also have access to the computing and storage resources (e.g., databases, etc.) provided by the cloud 312.

In certain embodiments, the command center 310 or the cloud 312 may include computing resources to generate an identifier based on information received from the device 308 as soon a respective communication link is established. The information may include video data, audio data, or any other data associated with the subject 304 that is provided using a suitable interface. The video data or the audio data may include a portion of the real time input data stream received by the device 308. In one example, based on the video or audio data, facial recognition or voice recognition of the subject 304 may be performed respectively to generate the identifier. In another example, another biometric identifier (e.g., fingerprints, retina scan, or iris scan) may be used. In yet another example, a personal identifier such as the DL number, SSN, medical record number, phone number, DOB, vehicle registration number, etc. may be used. The identifier may be used to retrieve the reference data 114 and any ML models associated with the subject 304. In certain other embodiments, the identifier may be provided by the device 308.

In certain implementations, the computing and storage resources may be shared between the command center 310 and the cloud 312. For example, one or more server computer(s) and memory storage associated with the cloud 312 may be accessible to the command center 310 to provide the computing and memory resources for the law enforcement organization. The one or more server computers or the memory storage may be located at the command center 310, or in remote locations. In other implementations, the command center 310 may include its own computing and memory resources which may be accessible to the cloud 312 or the device 308.

In certain embodiments, the command center 310 may have access to the environment data 112 related to the location of the subject 304. The environment data 112 may include metadata associated with the crime rate of the nearby areas, crime reports, major events taking place in the area, places of significance in the area (e.g., museums, temples, government offices, sports arena, concert halls, airports, theaters, train stations, campuses, etc.) or any recent criminal activity in the area. The environment data 112 may be based on daily crime logs, felony records, arrest records, police reports, open warrants, accidents, etc. associated with that location. The environment data 112 may also include metadata from one or more nearby cameras (e.g., traffic lights or buildings in the area). In certain examples, a portion of the environment data 112 may be received from the cloud 312. For example, the cloud 312 may store a log of crime rate of each area, places of significance in the area, and any other static data related to the location.

In certain embodiments, the application based data can be obtained from external entities having access to law enforcement specific data, e.g., DMV, FBI(dot)gov, justice(dot)gov, amberalert(dot)ojp(dot)gov. The application based data can be retrieved by the command center 310 or by the device 308 using a network interface. In various embodiments, the device 308 may be capable to communicate directly with certain websites or agencies using its IP address and appropriate APIs to obtain a portion of the metadata to accelerate the recommendation generation. For example, certain application specific data and APIs can be obtained from data(dot)gov, drive record of the subject can be fetched from the DMV, medical record of the subject can be fetched from an organization keeping medical records, or the criminal record of the subject can be fetched from the NCSC, among others.

In certain instances, upon encountering or noticing the subject 304, the law enforcement officer 302 may use a button, touch screen, or a voice command to start video and/or audio recording using the camera or the microphone on the device 308, or coupled to the device 308. The recording may be continuous or may be started prior to the incident. For example, the application policy engine 102 may initiate establishing communication with the cloud 312 and the command center 310 as soon as the application policy engine 102 detects a change in the real time input data stream. A portion of the metadata (e.g., the environment data 112, updated generic ML model or the dedicated ML models) can be downloaded once the communication link is established. In certain embodiments, the real time input data stream data can be continuously stored in a circular buffer on the device 308. The recorded data can be uploaded to the cloud 312 at a regular interval (e.g., every 15 minutes, every hour, etc.) based on the size of the buffer and can be overwritten with the new recording data. In certain examples, the recorded data may be uploaded to the cloud 312 every time a communication link is established between the device 308 and the cloud 312.

As shown in FIG. 3, for the example use case 300, the video data stream 108 can be used to perform facial recognition or emotion detection of the subject 304 as shown by (circled) step 1. The audio data stream 110 can be used to perform tone detection of the subject 304, as shown by step 2. The video data stream 108 can also be used to perform body language or movement detection of the subject 304, as shown by step 3. A portion of the video data stream 108, audio data stream 110 and any other data associated with the subject 304 can be uploaded to the cloud 312 as soon as the system is engaged (e.g., a communication link is established between the device 308 and the cloud 312) as shown by step 4. Similarly, the video data stream 108, audio data stream 110 and any other relevant data associated with the subject 304 can be fed live to the command center 310 as shown by step 6. Note that the steps 4 and 6 can be performed in parallel.

The device 308 may be capable to receive the metadata from the cloud 312, the command center 310, or other external entities. The metadata may include the one or more ML models 106, environment data 112, or the reference data 114. The environment data 112 may include location specific data associated with the location of the subject 304, and application specific data associated with the application for the law enforcement organization. The reference data 114 can be retrieved using an identifier associated with the subject 304. The identifier may be generated by the device 308 or another device coupled to the device 308 using the real time input data stream or external data inputs. In certain examples, the identifier may be generated based on facial recognition, voice recognition, retina scan, iris scan, fingerprinting, vehicle registration number, etc. In certain other examples, some of the information associated with the subject 304 (e.g., name, phone number, address, DOB, vehicle registration number, DL number, or SSN) may be provided using a voice command, keypad, or a touch screen, which can be part of the device 308, or another device accessible to the law enforcement officer 302 and coupled to the device 308. The application policy engine 102 may use the information associated with the real time input data stream or external data inputs to generate the identifier associated with the subject 304 to obtain the reference data 114 and the baseline reference ML model. In certain examples, the identifier may be generated by the cloud 312 based on the uploaded information by the device 308.

A portion of the metadata including the reference data 114 or the ML models 116 can be received from the cloud 312 as shown by step 5. In certain examples, the command center 310 may provide audio data, video data, or another portion of the metadata (e.g., the environment data 112) in step 7. In other examples, the location specific data portion of the environment data 112 can be received in step 5 or step 7. A portion of the reference data 114 (e.g., DMV record, medical records, criminal background, etc.) or the application specific portion of the environment data 112 may also be received directly by the device 308 from the external entities using the appropriate APIs. The application specific data or the location specific data may be downloaded on the device 308 prior to encountering the subject 304. In certain examples, the command center 310 may provide a real time data stream comprising the real time video data stream and the audio data stream from other sources in the vicinity of the subject 304 to the device 308 in step 7. For example, the other camera may belong to another law enforcement officer present at that location, or the camera may be installed on a nearby building or a traffic light. The audio data from the command center 310 may also include verbal instructions to the law enforcement officer 302.

In certain examples, based on the application policy 116, a baseline profile and a baseline reference ML model associated with the subject 304 can be downloaded as part of the metadata from the cloud 312 in the step 5. In certain examples, an up-to-date application policy 116 can be downloaded from the cloud 312 in the step 5 or from the command center 310 in the step 7 and updated automatically on the device 308. In certain embodiments, the cloud 312 and the command center 310 may have access to the same database storing metadata associated with the subject 304. In some examples, a portion of the metadata provided to the device 308 in the step 5 or in the step 7 may be the same. In certain embodiments, a separate and super-fast communication link can be established between the device 308 and the cloud 312 or the command center 310 for a quick retrieval of the metadata to accelerate threat detection.

The application policy engine 102 can process the video data stream 108 and the audio data stream 110 to infer the biometric characteristics of the subject 304 using the ML model(s) 106 as shown by the steps 1, 2 and 3. The ML models 106 may include the generic ML model, baseline reference ML model, or one or more dedicated ML models. In certain examples, the steps 1, 2, and 3 can be performed in parallel to accelerate the detection of emotions, tone, body language or movement, or other biometric characteristics using the one or more ML models 106. In certain embodiments, the ML model 106 may also be trained to identify other subjects or objects in close proximity to the subject 304. For example, the subject 304 may be inside a vehicle with other individuals in the vehicle, or the subject 304 may be surrounded by other humans, objects, or buildings.

The application policy engine 102 can determine whether the application policy 116 has been violated, conformed to, or missed based on a correlation between the metadata and the inferred biometric characteristics. The application policy engine 102 can further provide a corresponding recommendation for an action based on the determination that the application policy was violated, conformed to, or missed, as shown by step 8. As the real time input data stream is processed by the application policy engine 102, additional metadata may be downloaded from the cloud 312, command center 310, or the external entities. The application policy engine 102 can process the real time input data stream continuously for a more precise prediction and for correlation with the metadata to provide the corresponding recommendation in a quick manner.

In one example, the ML model(s) 106 may infer anger (step 1), a threatening tone (step 2), or a weapon in subject's possession (step 3) using the real time input data stream. The real time input data stream may be provided to the cloud 312 (step 4) and the command center 310 (step 6) with or without an identifier associated with the subject 304. The metadata may be downloaded from the cloud 312 (step 5), the command center 310 (step 7), or the external entities and can be stored on the device 308. The reference data 114 associated with the subject 304 may indicate that the subject 304 has a criminal history, and the environment data 112 may indicate a recent criminal activity near the location of the subject 304 based on a crime report. The application policy engine 102 may determine that the application policy 116 has been violated based on a correlation between the inferred biometric characteristics, environment data 112 and/or the reference data 114. For example, a rule in the application policy 116 may indicate that if a first condition (criminal history) OR a second condition (nearby criminal activity) OR a third condition (threatening tone) OR a fourth condition (weapon) is true then the application policy 116 has been violated. The policy violation 118 may be asserted to indicate violation of the application policy 116. The corresponding recommended action (step 8) as defined by the rule may indicate arresting the subject 304.

In another example, the ML model(s) 106 may infer fear (step 1), apology (step 2), and surrendering (step 3) using the real time input data stream. Furthermore, the reference data 114 associated with the subject 304 may indicate that the subject has no criminal history, and the environment data 112 may indicate no criminal activity near the location of the subject 304 based on the crime report. The application policy engine 102 may determine that the application policy 116 has been conformed to based on a correlation between the environment data 112, reference data 114, and the inferred biometric characteristics. For example, a rule in the application policy 116 may indicate that if a first condition (no criminal history) AND a second condition (no criminal activity) AND a third condition (fear) AND a fourth condition (surrender) is true then the application policy 116 has been conformed to. The policy conformance 120 may be asserted to indicate conformance of the application policy 116. The corresponding recommended action (step 8) as defined by the rule may indicate no arrest and refraining from using the firearm 306.

Certain embodiments can be used to identify that a vehicle in the possession of the subject 304 is a stolen vehicle based on the registration plate, model or color of the vehicle from the real time video data stream 108. For example, the ML model(s) 106 may infer nervousness based on the subject's facial expressions and the body language. Furthermore, the environment data 112 may indicate that the vehicle was stolen recently based on the crime report, and the reference data 114 may indicate that the subject 304 has a criminal history. In certain embodiments, the command center 310 may determine that the vehicle is a stolen vehicle based on the video data stream in step 6 and may provide appropriate environment data 112 in step 7. The application policy engine 102 may determine that the application policy 116 has been violated based on the correlation and may recommend an action (step 8) based on the application policy 116 for the vehicle theft as defined by the respective rule. For example, the corresponding recommended action may indicate arresting the subject 304.

In certain embodiments, the recommended action may vary based on the level of policy violation. For example, in one instance, the recommended action may include taking the subject 304 under custody or hand cuffing the subject 304 for a non-life threatening misdemeanor. In another instance, the recommended action may include using the firearm 306 if the encounter was life threatening for the law enforcement officer 302 or anyone else in the vicinity. In certain instances, the recommended action may be ignored or overridden by the law enforcement officer 302 or the command center 310. In certain embodiments, based on the recommendation, the action can be performed by the device 308. For example, the device 308 can disable the firearm 316 based on the recommendation for a policy conformance, a policy miss, or certain policy violations.

In certain embodiments, the law enforcement officer 302 can enable the device 308 via a user interface to use the baseline reference ML model associated with the subject 304 to determine if the subject 304 was driving under the influence of alcohol or drugs. The user interface may include a touch screen, a keypad, or an audio device associated with the device 308. The subject 304 may be asked to perform the same body movements or motions (e.g., walk and turn test), or speak the same predetermined phrases as stored in their baseline profile. The application policy engine 102 can use the baseline reference ML model to determine if the subject was driving under the influence of alcohol or drugs based on the inferred biometric characteristics of the subject relative to their baseline biometric characteristics. For example, if the inferred biometric characteristics in correlation with the reference data 114 (e.g. baseline profile of the subject 304) didn't meet a policy threshold, it may indicate a policy violation (e.g., the subject failed the walk and turn test). In this example, the policy violation 118 may indicate that the subject 304 is under the influence and the policy conformance 120 may indicate the subject 304 is sober. In certain examples, a fake or stolen identity used by the subject 304 can be detected using the baseline profile and the baseline reference ML model.

In certain implementations, a portion of the metadata can be downloaded preemptively on the device 308 even before encountering the subject 304. For example, the device 308 can be configured to download the relevant metadata as the location of the law enforcement officer 302 changes, or as initiated by the law enforcement officer 302. As an example, in the threat prone areas, high crime locations or locations with possible criminal activities, the law enforcement officer 302 can initiate downloading of any relevant metadata including appropriate ML models to the device 308 even before arriving at the location. The relevant metadata may include location specific data and the application specific data and can be downloaded directly by the device 308 from the respective external entities, or via the command center 310. The appropriate ML models can include dedicated ML models that may have been trained with datasets specific to certain individuals associated with the area (e.g., sex offenders living in the area, gang members, terrorists, etc.). In certain embodiments, the dedicated ML models can be executed along with the generic ML model or the baseline reference ML model to identify the subject 304 and other individual(s) in close proximity.

In certain embodiments, the device 308 can be configured to utilize edge computing to run autonomously in the event of the uplink connectivity failure. The application policy engine 102 can pre fetch one or more metadata as soon as any input data associated with the subject 304 is available so that the application policy engine 102 can function independently without having to depend on external factors such as connectivity etc. In the event, all of the metadata is not available; the recommendation may be generated by the application policy engine 102 using the available data and may be limited in scope. For example, the application policy engine 102 may use the ML model(s) 106, application policy 116 and any metadata (e.g., application specific data) stored on the device 308 to provide the recommendation without relying on all of the metadata. However, in certain instances, a threat may still be detected without having access to all of the metadata. For example, the device 308 may execute the dedicated ML model which may have been trained to infer biometric characteristics of certain individuals. This dedicated ML model can be retrained with the new data as it becomes available and can be downloaded to the device 308 as and when the connectivity is available. However, as and when the metadata is available, the recommendation can be updated. The updated recommendation may or may not differ from the previous recommendation. In various embodiments, the dedicated ML model can be executed as soon an individual is noticed, or can be executed in parallel with the other ML models after receiving the metadata.

In certain embodiments, the application policy engine 102 can be configured to lock the firearm 306 automatically to disable the firing if the policy was not violated. For example, the device 308 may be capable of enabling or disabling the firearm 306 using a wireless or wired interface. The device 308 may also be capable to simultaneously send an alert or a summary of the incident to the command center 310. The summary of the incident may also be stored in a persistent storage as per auditing/forensics specification locally on the device 308 or sent to the cloud 312 for archival or reference.

In the case of the policy miss 122, the data associated with the incident may be used to update the ML models 106 as the real time learning data 126. For example, the policy miss 122 may occur if the ML model 106 was not trained for a specific scenario or due to insufficient data so an appropriate recommended action cannot be determined. In such cases, the real time learning data 126 may be used to further train the ML model for future predictions. In certain embodiments, the ML model 106 can be patched in real time using data associated with the incident upon a policy miss. For example, a certain memory potion in the ML model 106 can be reserved for patching and can be updated by the application policy engine 102. In some instances, the data for patching the ML model 106 can be entered using an API. The default action for the policy miss 122 may include logging the summary of the incident data in the cloud 312 or locally.

In the case of the policy conformation 120, no action may be recommended to the law enforcement officer 302 and the default action may include logging the summary of incident data in the cloud 312 or locally.

The summary of the incident may include whether the policy was violated, conformed to or missed, the recommendation for an action provided by the application policy engine 102, action performed by the law enforcement officer, information associated with the subject 304 (e.g., personal details, vehicle details, etc.), information associated with the law enforcement officer (e.g., name, badge ID, etc.), location (e.g., zip code, name of the place, etc.), crime details (e.g., date and time of the incident, other witnesses or involved individuals, injuries, etc.) and any other relevant details about the incident (e.g., damage at the location). In certain examples, the summary of the incident may also include whether the recommendation was overridden by the law enforcement officer 302 or the command center 310. The summary of the incident can also be used to further train the ML models 106 for future predictions, e.g., as the learning data 204 in FIG. 2.

Thus, certain embodiments can rely on correlation between multiple types of input data to recommend a local action which can provide a more accurate prediction as compared to systems relying on a single type of data. Furthermore, injuries or loss of life can be avoided by performing AI based recommended actions. Certain embodiments can also help move deep evaluation aspect of the incident to pre-stage from post by logging the summary of the incident in the memory. For example, if the law enforcement officer ignores AI based recommendation, thus leading to a loss of life, injury, or another undesirable outcome, the law enforcement officer can be held accountable based on the summary. Furthermore, the discrepancy between the recommended action and the action performed by the law enforcement officer can be used as the learning data to update the ML models.

Note that certain embodiments can be used to perform automated threat detection and evaluation proactively for other applications. For example, the application policy engine 102 can be used to perform automated threat detection and evaluation proactively during or before an encounter with a subject, during or before an incident involving large crowds as a precautionary measure, or under other circumstances as needed (e.g., at concerts, airports, train stations, sporting events, theaters, tourist attractions, school campuses, museums, temples, government buildings, etc.). In certain examples, the application policy engine 102 may be used to detect a threat as individuals enter a building or a campus.

Figure 4:
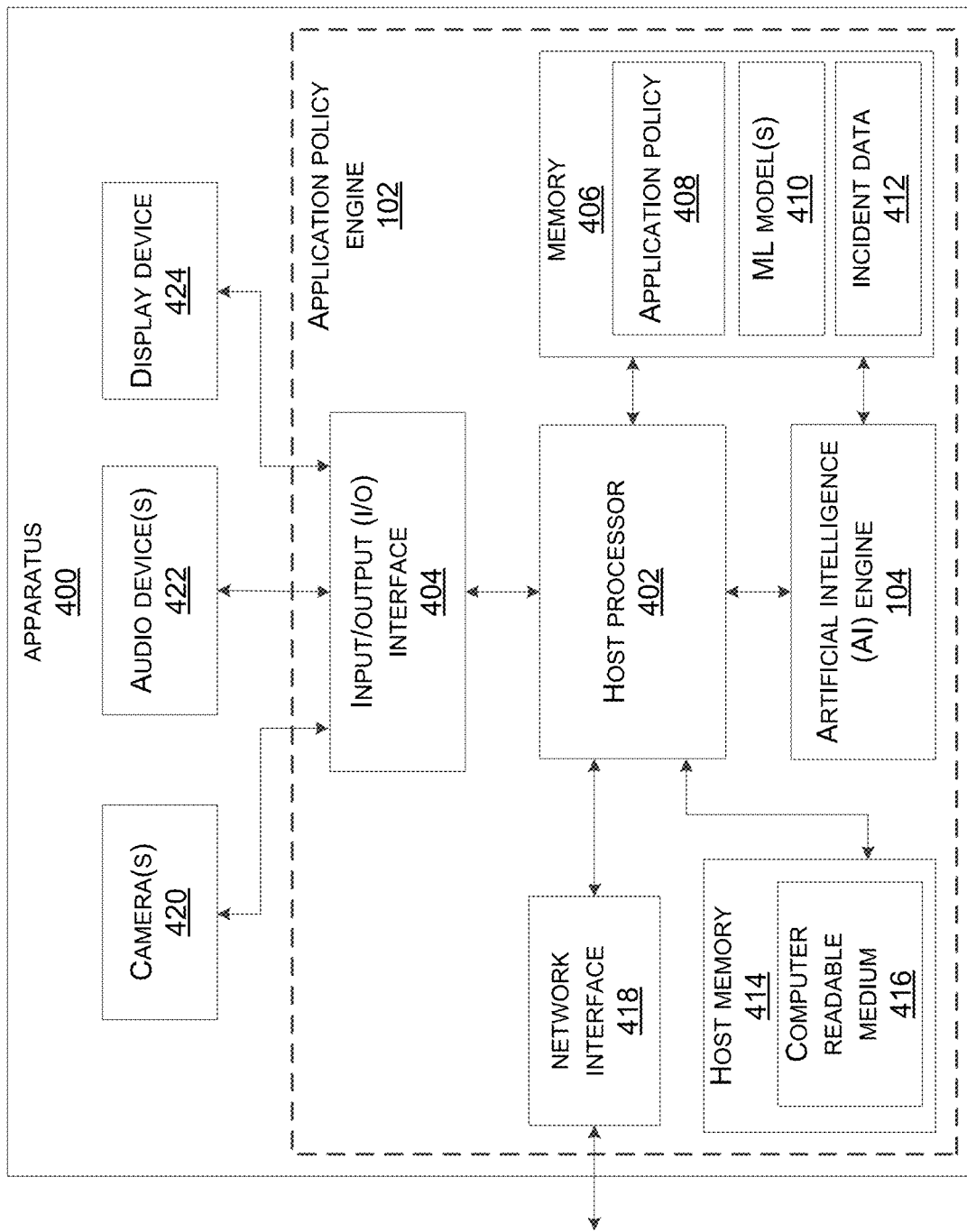
FIG. 4 illustrates an example block diagram for an apparatus that can be used to provide a recommendation for an action using AI, in various embodiments.

FIG. 4 illustrates an example block diagram for an apparatus 400 that can be used to provide a recommendation for an action using AI, in various embodiments. The apparatus 400 can be used to determine policy conformance, or to detect and evaluate a threat based on an application policy for a specific application. The apparatus 400 may be part of an embedded computer system, a device, or machinery, among others. In certain embodiments, the apparatus 400 can be part of the device 308 discussed with reference to FIG. 3. In other embodiments, the apparatus 400 can be used on traffic lights or buildings (e.g., airports, train stations, shopping malls, concert halls, sports arenas, popular tourist spots, museums, temples, school or college campuses, government offices or other threat prone areas) to automatically detect threat and generate an alert based on the application policy. In other embodiments, the apparatus 400 can be used in warehouses, manufacturing or assembling plants, factories, or other business organizations involving human workers to provide goods or services. In various embodiments, the apparatus 400 can be part of an edge device configured to run autonomously in the absence of network connectivity.

The apparatus 400 may include the application policy engine 102 which can be coupled to one or more of a camera 420, audio device 422, and display device 424. Note that different embodiments may include additional or different components in the apparatus 400 to perform the functionality needed for the specific application. In one embodiment, the apparatus 400 may be part of a mobile phone, a personal data assistant, a body camera, a radio, or another suitable device generally used by the law enforcement officers. The device may also include hardware for wearing or attaching the device to the officer's belt or clothing, on the dashboard of a car, or the body of the car. In another embodiment, the apparatus 400 may be part of a device that can be installed on a building or a traffic light using suitable hardware. In certain examples, the apparatus 400 may be part of a camera device having localized AI to automatically detect threat. For example, the cameras installed on the buildings or traffic lights may include certain functionality or components of the apparatus 400 to automatically detect a threat in real time using AI, and generate an alert.

In certain embodiments, the application policy engine 102 may include a host processor 402 coupled to the AI engine 104, an input/output (I/O) interface 404, memory 406, host memory 414, and a network interface 418. In various embodiments, one or more components of the application policy engine 102 or their functionality may be integrated. For example, a portion of the host memory 414 or the network interface 418 may be integrated with the host processor 402. The memory 406 may be configured to store one or more application policies 408, one or more ML models 410, incident data 412, and any other relevant data. The one or more application policies 408 may include the application policy 116, and the one or more ML models 410 may include the ML models 106 from FIG. 1.

The memory 406 may include any variation of volatile or non-volatile memory, e.g., SRAM, DRAM, flash, ROM, EEPROM, etc. In certain implementations, one or more of the application policies 408, the ML models 410, or the incident data 412 may be stored on separate memory devices, e.g., memory card, flash, etc. The incident data 412 may comprise a portion of the real time input data stream, a summary, information associated with the subject (e.g., personal information, belongings, location, employee ID, etc.) and other relevant information associated with the incident involving the subject. In certain implementations, a portion of the real time input data stream can be stored in a circular buffer which may be part of the incident data 412. For example, the real time input data stream can continue to be recorded on the apparatus 400 until the circular buffer is full, at which point the circular buffer wraps around and the real time input data stream can start overwriting the previous data stored in the circular buffer. In certain examples, the portion of the real time input data stream stored in the circular buffer can be uploaded to the cloud 312 (step 4) before getting overwritten with the new data. The real time input data stream can also be fed live to the command center 310 (step 6) simultaneously.

Different components of the application policy engine 102 may communicate with one another using bus interfaces based on any suitable bus protocol, e.g., peripheral component interconnect (PCI) based protocol, serial bus, SATA, parallel ATA, proprietary bus protocol, among others. In various implementations, the application policy engine 102 may include one or more memory controllers, direct memory access (DMA) controllers, bus controllers, buffers, or other suitable components to facilitate the communication among different components.

The I/O interface 404 may include one or more interfaces to communicate with various I/O devices, e.g., the camera(s) 420, audio device(s) 422, and a display device 424. As an example, the I/O interface 404 may include bus interfaces (e.g., serial peripheral bus interface, universal serial bus interface, peripheral component interconnect, inter-integrated circuit bus, etc.), controllers (e.g., I/O controllers, bus controllers, etc.), connectors, pins, wires, or ports, any other suitable components to provide I/O connectivity to various I/O devices communicating with the host processor 402. The one or more I/O devices can be accessed using the respective APIs or another suitable interface.

Note that FIG. 4 shows the camera(s) 420, audio device(s) 422, and the display device 424) as an example of the I/O devices, however, it will understood that the apparatus 400 may include or be coupled to other I/O devices without deviating from the scope of the disclosure. For example, the apparatus 400 may also include or be coupled to a keypad, button, switch, location detector, sensor, fingerprinting device, retina scanner, iris scanner, gas leakage detector, multi-gas detector, smoke detector, explosives detector, temperature monitor, LEDs, smart lights, vibrator, among others. The button or the on/off switch may be used to enable or disable the apparatus, start recording the video or audio data stream being fed to the apparatus 400, etc. The keypad may include a set of keys to allow entering information using the keys. The fingerprinting device may be used to obtain the fingerprints of the subject. The retina scanner or the iris scanner can be used to obtain a retina scan or an iris scan of the subject. The fingerprints, iris scan or the retina scan can be used to generate an identifier associated with the subject to retrieve metadata associated with the subject. The gas leakage detector, multi-gas detector, smoke detector, or the explosives detector may be used to detect various smells or gases that may or may not be hazardous. LEDs or smart lights with different colors may be used to indicate the policy violation 118, policy conformance 120, or the policy miss 122. The vibrator may be used to vibrate the apparatus 400 to indicate that the policy violation 118, policy conformance 120, or the policy miss 122 has occurred. In certain embodiments, one or more I/O devices may be external to the apparatus 400.

The one or more cameras 420 may be used to capture photos or videos to provide the video data stream 108 in real time to the application policy engine 102. The camera(s) 420 may include one or more camera lenses, image sensors, view finder, image processor, or other suitable components to provide the video data stream 108. The captured video data can also be stored in memory which can be part of the camera(s) 420 (e.g., flash or a memory card), or the incident data 412 in the memory 406. The one or more audio devices 422 may include a speaker, a microphone, or another suitable component to provide the audio interface for the apparatus 400. The audio data stream 110 may include voices, conversations, commands, background noise, or other sounds. The microphone may be used to receive audio data stream 110 from the location of the apparatus 400. The speaker may be used for giving verbal warnings or playing audio. For example, the speaker in the device 308 can be used to provide verbal instructions received by the command center 310, as shown by step 7 in FIG. 3. The audio data stream 110 may or may not be coupled to the video data stream 108. For example, the audio data stream 110 may provide sound for the video data stream 108, or may be used for audio only. In certain instances, the video data stream 108 may be used for still shots or video only.

The application policy engine 102 may use the real time video data stream 108 and the audio data stream 110 to infer certain biometric characteristics of subject(s). The biometric characteristics may include physical or behavioral characteristics of the subjects. For example, the application policy engine 102 may perform facial recognition, emotion detection, tone detection, body language or movement detection to detect or rule out a threat, e.g., as discussed with reference to steps 1, 2 and 3 in FIG. 3. The video data stream 108 and the audio data stream 110 may also be used by the application policy engine 102 to determine whether the subject is under the influence of a drug or alcohol using the baseline reference ML model and the baseline profile associated with the subject. The video data stream 108 and the audio data stream 110 may also be used by the application policy engine 102 to detect identity theft. The video data stream 108 and the audio data stream 110 may also be used by the application policy engine 102 to detect a physical threat to a worker while performing a task associated with an application.

In certain embodiments, the apparatus 400 may also be capable to receive video and audio data from other cameras in the vicinity. For example, in a large area, multiple cameras may be located at different locations to provide different views of the area to the apparatus 400. The apparatus 400 may be part of a computer system located at a central location or in a control room to provide a localized decision on threat detection based on the application policy. In certain examples, the application policy engine 102 may be implemented in a traffic light controller and multiple cameras may be placed on various traffic lights. The video data stream 108 and the audio data stream 110 can be uploaded to the cloud 312 as discussed with reference to step 4 in FIG. 3, or could be fed to the command center 310 as discussed with reference to step 6 in FIG. 3. In certain embodiments, the application policy engine 102 may use the video data stream 108 or the audio data stream 110 stored in the memory 406 instead of the video data stream 108 or the audio data stream 110 received directly via the I/O interface 404 from the camera(s) 420 or the audio device(s) 422.

The display device 424 may include a touch screen or another type of screen for display. In certain examples, the touch screen can be used to allow the subject 304 or the law enforcement officer 302 to enter certain information which can be used to generate an identifier associated with the subject 304. For example, the law enforcement officer 302 may enter the subject's name, DOB, phone address, address, SSN, DL number, or another identifier using a keypad (not shown), the touch screen or another external interface associated with the apparatus 400. The law enforcement officer 302 may also enter his/her name, badge number, or another identifier using the keypad, touch screen or another suitable interface. The information entered using the keypad or the touch screen can be received by the application policy engine 102 to retrieve additional metadata from the cloud 312 or the command center 310. In certain examples, the display device 424 can be used to display a task to be performed by the subject 304 based on the baseline profile of the subject 304. In certain examples, the display device 424 can be used to display the recommendation for an action provided by the application policy engine 102 in the form of text or image.

In certain examples, instead of entering the information using the keypad or the touch screen, the law enforcement officer 302 may speak identifying information associated with the subject into the microphone on the apparatus 400, which can be received by the application policy engine as the audio data stream 110. In another example, fingerprinting, iris scan, retina scan, or another identification method may be used. The application policy engine 102 may provide the entered information to the cloud 312 in the step 4 or to the command center 310 in the step 6, which can be used to retrieve metadata associated with the subject 304.

In certain embodiments, one or more sensors, e.g., compass, magnetometer, gyroscope, accelerometer, barometer, etc., may be used for motion detection, location detection, elevation detection, etc. In some instances, the one or more sensors may be used in conjunction with external location detector devices, or location data received using the network interface 418, e.g., via global positioning system (GPS), Wi-Fi, cell ID, Bluetooth, ultrasonic, etc., to determine location specific data portion of the environment data 112. In certain examples, the command center 310 can track the location of the apparatus 400 remotely and provide up-to-date location specific data to the apparatus 400 as its location changes.

The network interface 418 can be configured to provide network connectivity to enable communication between the host processor 402 and the cloud 312, command center 310, firearm 306, the server computer 200, or other entities. The communication may be based on any suitable network protocol using any suitable communication interface, e.g., cellular, WiFi, Bluetooth, TCP/IP, Ethernet, radio, Institute of Electrical and Electronics Engineers (IEEE) 802.11 wireless protocols, User Datagram Protocol (UDP), frame relay, Fiber Distributed Data Interface (FDDI), Asynchronous Transfer Mode (ATM), token ring, Point-to-Point Protocol (PPP), High Level Data Link Control (HDLC), InfiniBand, among others. The network interface 418 may also include appropriate hardware or components to facilitate providing the network connectivity, e.g., antenna, network interface controller, network adapter, modem, ports, connectors, pins, switches, or router, among others.

The AI engine 104 may be capable to provide intelligence to the apparatus 400 by executing the ML model(s) 410 to infer certain biometric characteristics which can be used in correlation with the associated metadata to provide a recommendation for an application specific action based on the application policy 408. The ML model(s) 410 may include a generic ML model, a baseline reference ML model, and other dedicated ML models to make different predictions. The application policy 408, generic ML model, baseline reference ML model and other dedicated ML models can be downloaded to the apparatus 400 as and when the connectivity is available. The baseline reference ML model can be downloaded based on an identifier associated with a subject to detect or rule out a threat involving the subject.

The application policy engine 102 may include on-chip or off-chip accelerators to handle varying inference workloads and provide predictions in a timely manner. The acceleration may be provided in hardware, software or a combination thereof. For example, specific accelerators may be used for low precision arithmetic, in-memory computing capability, or other data intensive tasks. In certain examples, the application policy engine 102 may include AI accelerators designed to provide acceleration for AI applications. Some non-limiting examples of the accelerators may include multi-core processor(s), graphical processing units (GPUs), or coprocessor(s), among others. In some examples, acceleration may be provided in software. In some examples, the application policy engine 102 may utilize high performance multicore execution engine to execute the ML model(s) 410. It will be noted that the embodiments can be implemented using any suitable AI platform that can handle varying AI inference workloads within the scope of the disclosure. An example AI engine is discussed in detail in FIG. 6.

The host processor 402 may include one or more processing cores which may be configured to execute instructions stored in a non-transitory computer readable medium. For example, the non-transitory computer readable medium may include the computer readable medium 416 to store a program that can be executed by the host processor 402. The computer readable medium 416 can be part of the host memory 414 or can be stored on a separate device (e.g., flash, EEPROM, ROM, CD-ROM, etc.). The host processor 402 can be the central processing unit (CPU) and may be based on any suitable processor architecture or similar to any processor developed by Intel®, ARM®, AMD®, etc. The host processor 402 may also be capable to execute an operating system (e.g., Linux, iOS, Windows, etc.) to manage hardware and software resources for the apparatus 400 and to provide a platform for running various applications. The host processor 402 may also include or access one or more program or data caches (not shown). The host memory 414 may include a variation of volatile or non-volatile memory. The host memory 414 may also store other information which is not shown here for the ease of simplicity. The computer readable medium 416 is discussed in detail with reference to FIG. 5.

Figure 5:
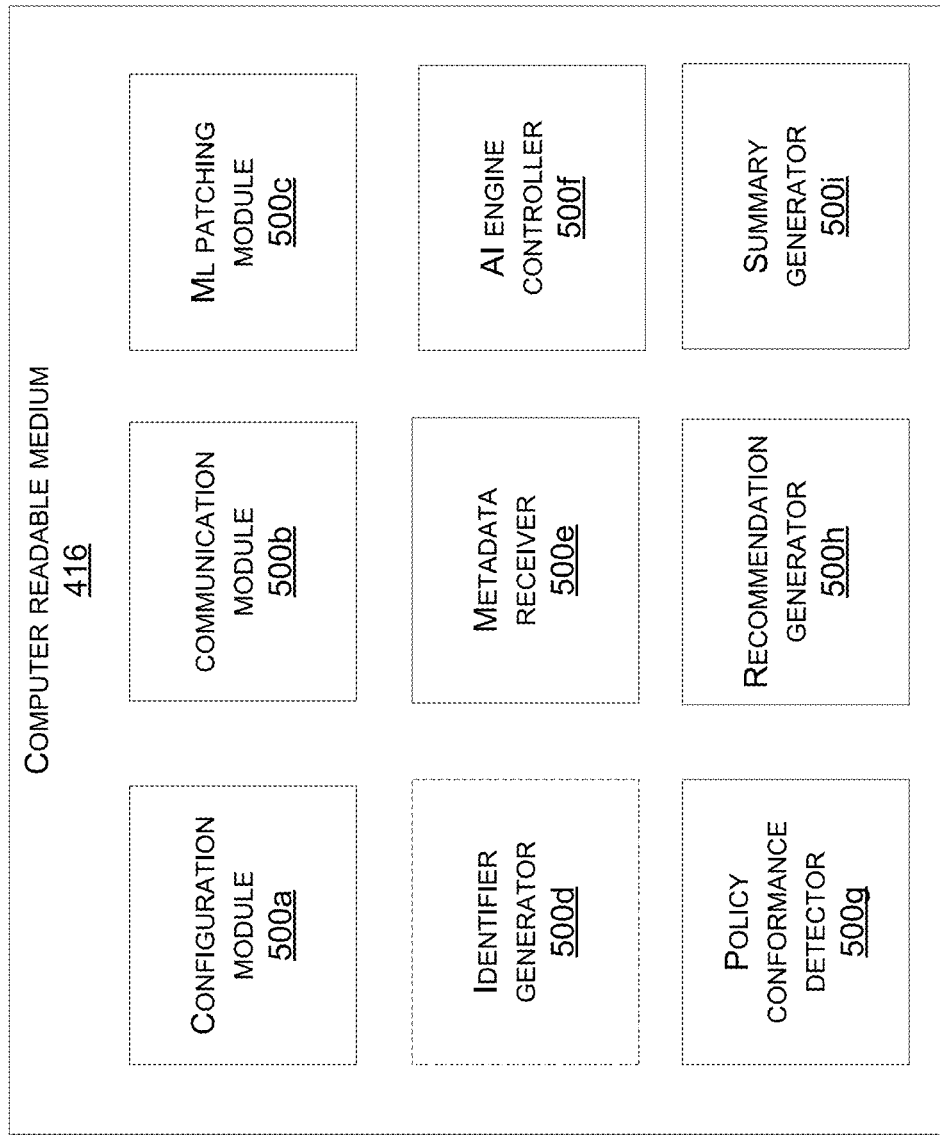
FIG. 5 illustrates components of a computer readable medium configured to store a program to be executed by a host processor, in one embodiment.

FIG. 5 illustrates components of the computer readable medium 416 in one embodiment. The computer readable medium 416 may comprise a configuration module 500a, a communication module 500b, an ML patching module 500c, an identifier generator 500d, a metadata receiver 500e, an AI engine controller 500f, a policy conformance detector 500g, a recommendation generator 500h, and a summary generator 500i. Note that the implementation of the computer readable medium 416 is not limited to FIG. 5 and other implementations are possible without deviating from the scope of the disclosure.

The configuration module 500a may be used to configure the apparatus 400 for different applications associated with an organization. For example, based on the specific application, one or more corresponding application policies 408 and the ML models 410 can be downloaded on the apparatus 400 to perform threat detection and evaluation based on the respective application policy and to provide corresponding recommended action. A generic application policy and the ML model(s) specific to the application may be stored in the memory 406 when the apparatus 400 is deployed in the field. The configuration module 500a can be configured to enable downloading of the appropriate and up-do-late application policy 408 or the ML models 410 in the on-chip memory (e.g., the memory 406) at specific times, or whenever a communication link is established with the cloud 312 or the command center 310.

The configuration module 500a may also be used to configure the type of representation for the policy violation 118, the policy conformance 120, and the policy miss 122 along with the recommended action using the APIs. For example, the policy violation 118, the policy conformance 120, the policy miss 122, or the recommended action can be represented using LEDs, smart lights, vibrator, display screen, speaker, audio tones, or another suitable medium. In certain embodiments, the configuration module 500a can be used to configure the application policy engine 102 to use a specific language (e.g., English, Spanish, etc.) for text or audio. The configuration module 500a can also be used to enable or disable the overriding feature for the recommended action. In certain embodiments, the configuration module 500a may be used to configure the available I/O devices for each specific application using the corresponding APIs. The configuration module 500a may also be used to configure locking or unlocking of the firearm 306 as discussed with reference to FIG. 3.

The communication module 500b may be used to communicate with the cloud 312, command center 310, server computer 200, or other external entities via the network interface 418. The communication module 500b may be used to upload the data on the cloud 312 or the command center 310 for referencing and archival. The communication module 500b may also be used to download the reference data 114 associated with a subject, or the environment data 112 comprising the location specific data and the application specific data. The communication module 500b may also be used to download the appropriate application policies 408 and the ML model(s) 410 from the cloud 312 for the specific applications. In various embodiments, the communication module 500b may include functionality to support appropriate communication protocols and encryption/decryption techniques for secure data transfer to and from the apparatus 400, e.g., using SSL, TLS, SFTP, FTPS, or HTTPS, among others.

The ML patching module 500c can be used to hot patch the ML model 410 being executed by the application policy engine 102 in real time. For example, in certain embodiments, a portion of the memory associated with the ML model 410 can be reserved to be patched in real time. As discussed with reference to FIG. 3, in some instances, the policy miss 122 can occur due to missing data. Certain embodiments can allow entering the missing data (e.g., a portion of the subject's personal information) via a user interface which can be used to update the portion of the memory associated with the ML model 410 in real time (e.g., using an API).

The identifier generator 500d can be used to generate an identifier associated with a subject that can be used to fetch the metadata. The identifier can be based on a mug shot or a photo, a voice sample, retina scan, iris scan, fingerprints, DL number, SSN, phone number, address, DOB, vehicle registration number or identification number of a vehicle belonging to the subject, among others. The identifier generator 500d can include functionality to generate the identifier based on the real time input data stream or external data inputs received via the I/O interface 404. For example, the identifier generator 500d can extract a photo of the subject or the vehicle's registration plate based on the video data stream 108. Similarly, a voice sample of the subject can be extracted based on the audio data stream 110. In certain embodiments, the identifier may be generated based on the facial or voice recognition of the subject using one of the ML models 410 stored in the memory 406. In other embodiments, the identifier generator 500d may include functionality to generate the identifier based on fingerprints, retina scan, or iris scan of the subject received via the I/O interface 404 using the appropriate I/O devices. In other embodiments, the identifier generator 500d may include functionality to generate the identifier based on information associated with the subject (e.g., the DL number, SSN, phone number, address, DOB, or vehicle registration number among others) that may have been provided using a voice command, keypad, a touch screen, or another suitable interface.

In certain embodiments, the identifier may be generated by the cloud 302 or the command center 312 and the identifier generator 500d may not be used. For example, a relevant portion of the real time input data stream, or external data inputs (e.g., as shown by steps 4 or 6 in FIG. 3) can be provided to the cloud 302 or the command center 312 using the communication module 500b and the network interface 418.

The metadata receiver 500e can be used to receive metadata using the network interface 418. The metadata may include the environment data 112, reference data 114, or the ML models as discussed with reference to FIG. 4. Different portions of the metadata can be received from the cloud 312, the command center 310 or external agencies using the communication module 500b. For example, the ML models, and the reference data 114 associated with the subject can be received from the cloud 312 as discussed with reference to step 5 in FIG. 3. A portion of the reference data 114 associated with the subject can also be received directly from the external agencies using the appropriate APIs. The environment data 112 can be received from the cloud 312 or the command center 310 as discussed with reference to steps 5 and 7 in FIG. 3. In certain embodiments, the application specific portion of the environment data 112 can be received directly from external agencies using the respective APIs. The received metadata can be stored in the memory 406 to be used by the AI engine 104. In certain embodiments, the received metadata may be processed before storing in the memory 406 so that the metadata is in a suitable format to be used by the AI engine 104. The received ML models can be stored as part of the ML models 410 in the memory 406. For example, the received ML models can include the baseline reference ML model associated with the subject, and any dedicated ML models based on the application. In certain examples, the received ML models can overwrite some of the existing ML models stored in the memory 406. Additionally, the reference data 114 and the environment data 112 can be stored as part of the incident data 412 in the memory 406.

The AI engine controller 500f can be used to manage execution of the one or more ML models 410 by the AI engine 104. For example, the AI engine controller 500f can be configured to provide controls to manage the data flow to the AI engine 104 to process the video data stream 108 or the audio data stream 110 using the one or more ML models 410. In various embodiments, the AI engine controller 500f can include respective functionality to support different implementations of the AI engine 104 to infer biometric characteristics of a subject using the video data stream 108 or the audio data stream 110. For example, the AI engine 104 may be implemented based on deep learning, neural networks, regression, clustering, classification, supervised learning, un-supervised learning, re-enforcement learning, or dimensionality reduction, among others. The AI engine controller 500f may be further capable to provide suitable interface for various implementations of the AI engine 104. The AI engine controller 500f can also support the accelerator functionality that may be implemented as part of the AI engine 104 or using the host processor 402. In certain embodiments, the AI engine controller 500f may be capable to support execution of multiple ML models by the AI engine 104 in parallel. For example, a first ML model can be executed for video inferencing and a second ML model can be executed for audio inferencing simultaneously.

The policy conformance detector 500g can be used to determine whether the application policy 408 has been violated, conformed to, or missed based on a correlation between the metadata and the inferred biometric characteristics. The inferred biometric characteristics can be provided by the AI engine 104 using the ML models 410. The metadata may include the reference data 114 or the environment data 112. The policy conformance detector 500g may determine whether the application policy 408 has been violated, conformed to, or missed based on a correlation between the inferred biometric characteristics, reference data 114 and/or the environment data 112. The environment data 112 and the reference data 114 can be obtained using the metadata receiver 500e.

In certain embodiments, the policy conformance detector 500g may be used to determine a correlation among a plurality of conditions and compare the correlation results with a policy threshold to determine if the application policy 408 has been conformed to, violated or missed. The plurality of conditions may be derived from the environment data 112 and the reference data 114. Each of the conditions in the plurality of conditions can be weighted using respective weight values that can be programmed based on the application. As an example, the policy conformance detector 500g may determine that the application policy 408 has been conformed to if the correlation result is less than the policy threshold, and that the application policy 408 has been violated if the correlation result is greater than or equal to the policy threshold. The policy conformance detector 500g may further determine that the application policy 408 has been missed if any of the conditions in the plurality of conditions were missing.

In certain embodiments, the policy conformance detector 500g may be capable to determine different levels of policy violation based upon multiple thresholds (e.g., a first level, second level, and highest level) that can be programmed based on the application. The AI engine 104 may assert the policy violation 118, the policy conformance 120, or the policy miss 122 based on the outcome. An example application policy 408 is discussed with reference to FIG. 7. The information associated with the policy violation 118, the policy conformance 120, or the policy miss 122 can be stored in the incident data 412 for referencing or archival. In certain embodiments, the policy conformance detector 500g may determine policy conformance to automatically detect and evaluate a threat. The weight values for different conditions and the threshold values can be part of the application policy 408.

The recommendation generator 500h may be used to provide the recommendation for an action corresponding to the policy violation 118, policy conformance 120, or the policy miss 122 as defined by the rules in the application policy 408. For example, the recommendation generator 500h may provide a first recommendation corresponding to the policy violation 118, a second recommendation corresponding to the policy conformance 120, and a third recommendation corresponding to the policy miss 122 for each rule in the application policy 408. Each recommendation for a respective rule may be defined by the application policy 408 based on the application. The recommendation for the action may be communicated to the respective I/O device using the I/O interface 404. The recommendation for the action may also be stored in the incident data 412 for archival. In certain examples, the recommendation for the action may include performing an action by the device 400, e.g., generating an alert or an alarm, disabling a firearm, among others.

The summary generator 500i can be used to generate a summary of the incident which can be used for referencing or archival. The summary may be stored in the incident data 412 and can be uploaded to the cloud 312 or the command center 310 by the communication module 500b via the network interface 418. In certain embodiments, the summary generator 500i may generate the summary based on auditing/forensic specification that may be part of the application policy 408. The summary of the incident may include whether the policy was violated, conformed to or missed, recommendation for the action, action performed, information associated with the subject and other involved entities, location, and any other relevant details about the incident. In certain examples, the summary of the incident may also include whether the recommendation was overridden.

Figure 6:
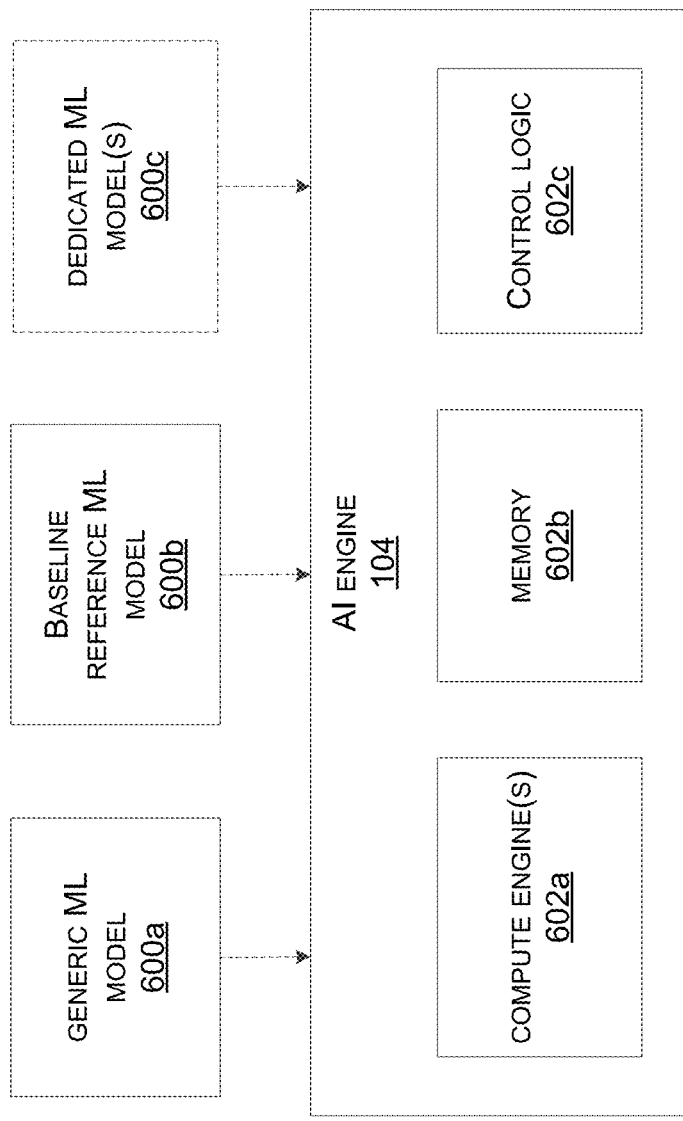
FIG. 6 illustrates an example representation of an artificial intelligence (AI) engine which can be used to describe certain embodiments.

FIG. 6 illustrates an example representation 600 of the AI engine 104, which can be used to describe certain embodiments.

The AI engine 104 can include hardware and software components to support the execution of the one or more ML models to infer certain biometric characteristics associated with a subject given a video data stream or an audio data stream. As an example, the AI engine 104 may include compute engine(s) 602a, memory 602b and control logic 602c. The one or more ML models can include a generic ML model 600a, a baseline reference ML model 600b, dedicated ML model(s) 600c or other suitable ML models that can be used to implement certain embodiments within the scope of the disclosed technologies. The generic ML model 600a, baseline reference ML model 600b, and the dedicated ML models 600c can be part of the ML models 410 as discussed with reference to FIG. 4. The generic ML model 600a, baseline reference ML model 600b, and the dedicated ML models 600c may have been trained for a specific application using the training platform 202 as discussed with reference to FIG. 2. The ML models 600a-600c may be based on neural network, regression, classification, decision tree, Bayesian, deep learning, dimensionality reduction, natural language processing, recommender systems, gradient boosting, clustering, or any suitable algorithm.

The compute engine(s) 602a may include one or more of microprocessors, coprocessors, neural network processors, accelerators, tensor processing unit, vision processing unit, graphics processing unit, and other suitable processing units. The compute engine(s) 602a may also include floating point units, arithmetic logic units, accumulators, registers, decoders, matrix multiplication units, activation units, normalization units, or other components based on the implementation. The compute engine(s) 602a may be configured to execute the one or more ML models 600a-600c to infer certain biometric characteristics (e.g., facial expressions, emotions, tone, body language or movement, among others) associated with a subject based on the video data stream or the audio data stream. The compute engines 602a may execute the one or more ML models 600a-600c simultaneously to accelerate the inferencing operations for different biometric characteristics.

The memory 602b may include any variation of SRAMs, DRAMs, ROMs, EEPROMs, flash, caches, buffers, or other suitable memory which can be used to provide volatile or non-volatile storage to support the execution of the ML models 600a-600c. The control logic 602c can be used to provide controls for the AI engine 104 based on the implementation. For example, the control logic 602c can include bus controllers, DMA controllers, memory controllers, microcontrollers, and other suitable logic to support the functionality of the AI engine 104. The AI engine 104 may be implemented using ASICs, FPGAs, SoCs, or memory devices, among others. The AI engine 104 can utilize any suitable software framework to support the execution of the ML models 600a-600c.

FIG. 7 illustrates an example representation of the application policy 408 in certain embodiments.

The application policy 408 can be configured to include various rules and corresponding recommendations as illustrated by M rows 700a, 700b, 700c, 700d, . . . , and 700m. Each rule may correspond to a respective recommendation 706 for an action based on a correlation between a plurality of conditions (e.g., a first condition 702a, a second condition 702b, a third condition 702c, . . . , and an Nth condition 702n) meeting a policy threshold 704. The "M" and "N" can be positive integers. Referring back to the use case 300 in FIG. 3, in one example, the plurality of conditions may be based on the inferred biometric characteristics of the subject 304, reference data 114 associated with the subject 304, and the environment data 112. The number of rules (e.g., the value of M), types of conditions, number of conditions (e.g., the value of N), policy threshold 704, and the corresponding recommendation 706 for the action can be programmed based on the application associated with the organization. For example, the application policy 408 for traffic related applications of the law enforcement organization may include different rules and recommendations than for the homicide related applications.

In the example illustrated in FIG. 7, the first condition 702a can be based on the environment data 112 comprising the location specific data or the application specific data. The second condition 702b can be based on the reference data 114 associated with the subject. The third condition 702c and the Nth condition 702n can be based on the inferencing results determined using the AI engine 104. In certain embodiments, each of the conditions 702a-702n can be represented as a respective Boolean value, e.g., true or false, one or zero. Each condition can also be weighted with a respective weight value as defined by the application policy 408. For example, the first condition 702a can be weighted with a first weight value, the second condition 702b can be weighted with a second weight value, the third condition 702c can be weighted with a third weight value, and the Nth condition can be weighted with an Nth weight value. The respective value of the weights can be programmed based upon the application intent.

A sum of the weighted conditions can be compared against the policy threshold 704 to determine whether the application policy 408 has been violated, conformed to, or missed. As an example, with the policy threshold 704 being 1, the sum being 0 may indicate that the application policy 408 has been met, and the sum being greater than 0 may indicate that the application policy 408 has been violated. Additionally, the violation of the application policy 408 can be categorized into a first level violation, a second level violation, up to a highest level violation. As an example, the first level violation can correspond to the sum being greater than 0 (e.g., >0) but less than and equal to a first threshold (e.g., <=0.3), the second level violation can correspond to the sum being greater than the first threshold but less than and equal to a second threshold (e.g., >0.3 but <=0.6), and the highest level violation can correspond to the sum being greater than the second threshold but less than and equal to a highest threshold (e.g., >0.6 but <=1). The application policy 408 may include corresponding recommendations based on the levels of policy violation. The policy threshold 704 and different threshold levels for the policy violation can be configured based upon the application. Any of the conditions 702a-702n missing a value can correspond to a policy miss.

As shown in FIG. 7 for a first rule in the row 700a, the first condition 702a being "high crime area" may correspond to a logical one, the second condition 702b being "criminal history" may correspond to a logical one, the third condition 702c being "no weapon or other visible threat" may correspond to a logical zero, and the Nth condition 702n being "angry expressions" may correspond to a logical one. The correlation among the conditions 702a-702n may correspond to multiplying the respective logical values for each of the conditions 702a-702n with their respective weight values and comparing the sum of the multiplication results with the policy threshold 704. Assuming the first weight value being 10%, the second weight value being 20%, the third weight value being 20% and the Nth weight value being 10%, the sum of the multiplication (1×0.10+1×0.20+0×0.20+1×0.10=0.40) may correspond to the second level of policy violation. The application policy 408 may include the recommendation 706 corresponding to the second level policy violation for the first rule as "make an arrest."

As shown in the row 700d, the second condition 702b may not be available which can result in a policy miss. For example, there may not be any information associated with the subject 304 (e.g., no personal profile stored in the cloud 312) or the ML model used by the application policy engine 102 may not be trained for a certain scenario (e.g., conflicting identifications due to mismatch in the metadata and the real time data). The recommendation 706 may include updating the missing information. In certain embodiments, the missing information can be hot patched in the ML model as discussed previously and the recommendation 706 can be generated again. In certain other embodiments, if the missing information is not available, the second condition 702b can be set to a false or a logical zero so that the recommendation 706 can be re-generated based on the available data. As shown in the row 700c, if the policy has been met, the corresponding recommendation 706 can be "no action." In certain embodiments, a firearm belonging to the law enforcement officer can be locked or disabled upon determining that the policy has been conformed to. As shown in the row 700m, if the highest level of policy violation has occurred, the recommendation 706 corresponding to the highest level policy violation can be "use the firearm." In certain instances, the recommended action can be performed by the device 400 by disabling the firearm.

In another example, the application policy 408 may include different rules and corresponding recommended actions for an application associated with a business organization (not shown). For example, the application may include performing a task (e.g., operating a machinery) by a worker of the business organization. As an example, the first condition 702a may be based on the operating condition of the machinery, the second condition 702b may be based on the previous accidents associated with the worker, the third condition 702c may be based on the physical state of the worker, and the Nth condition 702n may be based on the movements related to performing the task. In another example, for applications related to unloading or loading an object, one of the conditions may include characteristics of the objects (e.g., heavy, light, odd shaped, etc.). In another example, for applications related to outdoor tasks (e.g., drilling, construction related tasks, etc.) one of the conditions may include the current weather. The recommendation 706 may include generating an alert or an alarm, shutting down the system, a verbal warning, or no action, among others.

Note that the representation of the application policy 408 as discussed with reference to FIG. 7 is an example only, and other representations or implementations are possible without deviating from the scope of the disclosure. The threshold values and the weight values can be part of the application policy 408 but are not shown in FIG. 7 for ease of illustration. The threshold values and the weight values can be programmed based on the application intent. For example, in one application, the inferred biometric characteristics may have more weightage to determine the recommendation, and in another application, the reference data may have more weightage.

Figure 8:
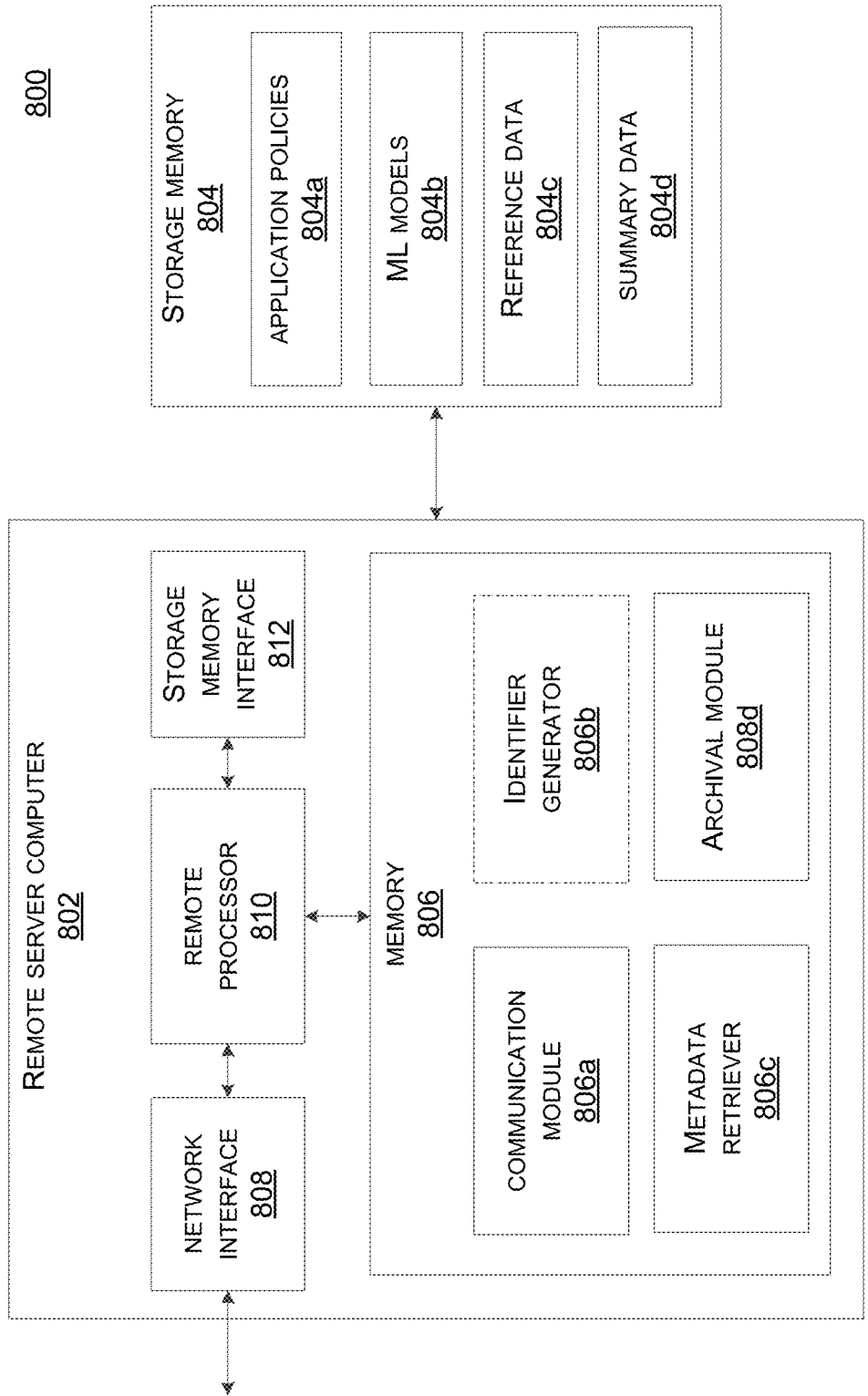
FIG. 8 illustrates a remote server computer coupled to a storage memory that can be used to provide computing and storage resources for an organization in certain embodiments.

FIG. 8 illustrates a remote server computer 802 coupled to a storage memory 804 that can be used to provide computing and storage resources for an organization in certain embodiments. The remote server computer 802 and the storage memory 804 may communicate with one another based on any suitable bus protocol, e.g., Non-Volatile Memory Express (NVMe), PCI based protocols, Serial Attached SCSI (SAS), Serial AT Attachment (SATA), Parallel ATA (PATA), any standard bus protocol, or a proprietary bus protocol. The remote server computer 802 and the storage memory 804 can be associated with the cloud 312, the command center 310, a control center, or another authorized entity for the organization.

In one embodiment, the remote server computer 802 may include a remote processor 810 coupled to a network interface 808, a storage memory interface 812 and memory 806. The remote processor 810 may include one or more processor cores which can be configured to executed instructions stored in a non-transitory computer readable medium. The computer readable medium may be part of the memory 806 or an independent device.

The storage memory 804 may include non-volatile or persistent storage, e.g., solid state drives (SSDs), hard disc drives, non-volatile flash, EEPROM, optical discs, ROM, etc. In certain embodiments, the storage memory 804 may also include volatile storage memory. The storage memory 804 can be configured to store databases for various applications associated with the organization. In certain implementations, the storage memory 804 may be configured to store application policies 804a, ML models 804b, reference data 804c, summary data 804d and other relevant data. In various implementations, one or more of the application policies 804a, ML models 804b, reference data 804c or the summary data 804d can be stored on separate memory devices.

A portion of the data stored in the storage memory 804 can also be stored on the apparatus 400, e.g., in the memory 406. For example, an application policy or an ML model associated with an application can be downloaded to the apparatus 400 (e.g., on deployment of the apparatus 400, or as and when the network connectivity is available) so that the apparatus 400 can perform certain functionalities autonomously when the real time input data is available without relying on the network connectivity.

The application policies 804a may include application policies associated with various applications for an organization. Each application policy in the application policies 804a may include different rules and corresponding recommended actions that can be configured based on the application. For example, the application policy for traffic related incidents may be different than the one used at the airport to detect threats. In certain examples, the application policies for the same type of applications (e.g., law enforcement) may be different for different precincts based on the associated regulations, guidelines or conditions. For example, in certain precincts, carrying a firearm may be legal, while for some other precincts, carrying any firearm may be prohibited. The application policies 804a may include the application policy 408 or the application policy 116 as discussed with reference to the previous figures.

The ML models 804b may include machine learning models for different applications. Each of the ML models 804b may have been trained using the respective offline training data associated with the particular application based on the respective application policy. The ML models 804b may have been trained using any suitable AI platform. In certain embodiments, the remote server computer 802 may also include functionality or components to provide an AI platform for training the ML models 804b similar to the server computer 200 as discussed with reference to FIG. 2. The ML models 804b may include the ML models 410 or the ML models 106 as discussed with reference to the previous figures. For example, the ML models 804b may include the generic ML model 600a, baseline reference ML model 600b and the dedicated ML models 600c.

The reference data 804c may include respective metadata associated with individuals. As an example, the reference data 804c may include personal information associated with a given individual and their belongings (e.g., vehicles, firearms, etc.). Some non-limiting examples of the reference data 804c may include name, address, phone number, DOB, SSN, DL number, biometric data (e.g., eye color, hair color, height, weight, fingerprints, retina scan, iris scan, etc.), criminal background, employment background, social media accounts, family background, race, ethnicity, citizenship, residential history, firearms ownership, vehicles ownership, credit history, and medical history (e.g., mental illness, disability, chronic illnesses, drug addiction, alcohol addiction, trauma, etc.), among others. The reference data 804c may include the reference data 114 as discussed with reference to previous figures. The reference data 804c for different individuals may be obtained from different organizations (e.g., DMV, FBI, social security, etc.), authenticated websites, or the individuals themselves.

The ML models 804b and the reference data 804c can be stored in the storage memory 804 using data structures that can be searched in a quick and efficient manner to accelerate retrieving of the metadata so that a more precise recommendation can be provided by the application policy engine 102 using the metadata. In certain implementations, the ML models 804b and the reference data 804c can be stored separately to enable performing a parallel search. The ML models 804b and the reference data 804c can be searched using an identifier associated with an individual to retrieve the appropriate baseline reference ML models and the reference data that can be used by the application policy engine 102 to make certain predictions about the individual.

The summary data 804*d* may include summary data associated with the incidents. A portion of the summary data 804*d* can be provided by the apparatus 400 for archival or reference. For example, the summary data 804*d* may include a summary associated with each incident. The summary may include a date, time, location of the incident, type of the incident (e.g., crime, traffic violation, accident, work task, etc.), identifying information associated with the involved entities (e.g., subject, law enforcement officer, vehicles, firearms, worker, supervisor), recommended action, recommended action performed or not performed, device ID, and any other relevant data associated with the incident. The summary data 804*d* may also include a portion of the video data stream 108, audio data stream 110, or inferred biometric characteristics of the subject associated with the incident. The summary data 804*d* can be used to follow up on the incident or for any future proceedings related to the incident as needed.

In certain embodiments, a portion of the environment data 112 (not shown) can also be stored in the storage memory 804, which can be part of the metadata. The environment data 112 may include application specific static data that can be obtained in advance of the incident and updated as necessary. For example, the application specific data may include any machinery related data, national crime information center (NCIC) database, DMV records, and other relevant static data based on the application.

The network interface 808 can be used to communicate with the apparatus 400, the command center 310 or external entities (e.g., FBI, DMV, etc.). The network interface 808 may utilize any suitable network protocol (e.g., TCP/IP, user datagram protocol (UDP), HTTP, SSH, SSL, FTP, etc.) to communicate with the apparatus 400, the command center 310, or the external entities. The network interface 808 may include network interface controllers, switches, routers, ports, pins, antennas, or other suitable components to provide the network connectivity.

The storage memory interface 812 can be used to communicate with the storage memory 804 based on any suitable bus protocol (e.g., PCIe, SATA, serial attached SCSI, USB, etc.). The storage memory interface 812 may include memory controllers, DMA controllers, buffers, pins, ports, or any other components suitable to facilitate the communication between the remote server computer 802 and the storage memory 804.

The memory 806 may include a communication module 806*a*, an optional identifier generator 806*b*, a metadata retriever 806*c*, and an archival module 808*d*. A portion of the memory 806 may be implemented as a non-transitory computer readable medium. For example, the memory 806 may include ROM, flash, EEPROM, or other suitable memory capable of storing instructions that can be executed by the remote processor 810. A portion of the memory 806 may be external or internal to the remote server computer 802.

The communication module 806*a* may be configured to enable the communication with the apparatus 400, command center 310, or the server computer 200 via the network interface 808. For example, the apparatus 400 may communicate with the remote server computer 802 to retrieve metadata for a subject. The apparatus 400 may provide a portion of the real time input data or an identifier to obtain the corresponding metadata as discussed with reference to step 4 in FIG. 3. The metadata can be retrieved from the storage memory 804 using the identifier. For example, one or more ML models 410 can be retrieved from the ML models 804*b*, and the reference data 114 can be retrieved from the reference data 804*c* using the identifier. The communication module 806*a* may also be used to provide the ML models 410 and the reference data 114 to the apparatus 400 via the network interface 808 as discussed with reference to step 5 in FIG. 3. The apparatus 400 may also communicate with the remote server computer 802 to archive the summary of the incident. The remote server computer 802 may store the summary data in the storage memory 804 for archival or reference.

In certain embodiments, the identifier generator 806*b* can be used to generate the identifier associated with a subject to retrieve the metadata. The identifier generator 806*b* can generate the identifier based on a portion of the real time video data or audio data provided by the apparatus 400. For example, the real time video data or audio data can be received via the network interface 808 and stored in the memory 806. In certain examples, the identifier generator 806*b* may utilize a face recognition algorithm, voice recognition algorithm or another suitable algorithm to generate the identifier. In certain instances, a vehicle registration number may be identified using a license plate number in the real time video data which can be used as the identifier. In certain instances, the apparatus 400 may provide personal information associated with the subject to the remote server computer 802 along with the real time input data which can be used to generate the identifier. For example, the personal information may have been received by the apparatus 400 using an external interface (e.g., fingerprinting device, retina scanner, iris scanner, keypad, microphone, touch screen, etc.).

The metadata retriever 806*c* can be used to retrieve a portion of the metadata using the identifier for sending to the apparatus 400. The identifier may be generated by the identifier generator 806*b* or provided by the apparatus 400 along with the real time input data. For example, the metadata retriever 806*c* can use the identifier associated with the subject to retrieve relevant ML model(s) 410 from the ML models 804*b*, and the reference data 114 from the reference data 804*c* via the storage memory interface 812. The metadata can be provided to the apparatus 400 by the communication module 806*a* using the network interface 808. In certain embodiments, a portion of the environment data 112 (not shown) may also be stored in the storage memory 804 which can be retrieved as part of the metadata and provided to the apparatus 400 along with the ML models 410 and the reference data 114.

The archival module 808*d* can be used to store the summary data associated with an incident in the summary data 804*d* in the storage memory 804 for archival or reference purposes. The summary data may be received from the apparatus 400 or the command center 310 using the network interface 808. The archival module 808*d* may provide the summary data for storing in the storage memory 804 via the storage memory interface 812. The archival module 808*d* can be configured to process the summary data for storing in the storage memory 804 in a suitable format.

FIG. 9 illustrates a computer-implemented method 900 to generate a recommendation for an action based on an application policy, in certain embodiments. The method 900 may be executed by the application policy engine 102. The application policy engine 102 may be part of the device 308 as discussed with reference to FIG. 3 or the apparatus 400 as discussed with reference to FIG. 4.

In step 902, an application policy engine may receive a real time input data stream comprising a video data stream or an audio data stream. The application policy engine may be configured to execute an ML model. For example, the application policy engine 102 may be configured to execute the ML model(s) 410 as discussed with reference to FIG. 4 and FIG. 6. In one example, the application policy 408 may be associated with a law enforcement organization and the law enforcement officer 302 may be interrogating the subject 304 proactively, for a criminal activity, for a traffic violation, or for a non-criminal activity. The application policy engine 102 may receive the real time input data stream comprising the video data stream 108 or the audio data stream 110. The video data stream 108 or the audio data stream 110 may be captured using the camera 420 or the audio device 422 and can be stored in the incident data 412 by the application policy engine 102 to be used by the AI engine 104 as discussed with reference to FIG. 4. Additionally, the real time input data and any other relevant data (e.g., identifying information associated with the subject 304 provided using an external interface) can be sent to the cloud 312 as well the command center 310 as discussed with reference to steps 4 and 6 in FIG. 3.

In certain examples, the real time input data stream may include real time video data stream or audio data stream from other sources besides the device itself. For example, the apparatus 400 may include capability to receive real time input data stream from other cameras or devices using the network interface 418. The other cameras or devices may belong to another law enforcement officer who may be present at the same location as the subject 304. In certain examples, cameras having network connectivity may be located on buildings or traffic lights near the subject 304. In certain examples, the real time input data stream from other sources can be provided to the device 308 by the command center 310 and can be received by the application policy engine 102 as the real time video data stream 108 or the audio data stream 110.

In another example, the application policy 408 may be associated with a business organization. The application policy engine 102 may be part of machinery, an apparatus that may be present in the vicinity of the machinery, or a device worn by a worker while performing a task for an application associated with the business organization. The real time video data stream 108 or the audio data stream 110 may include video or audio data stream of the worker performing a task. For example, the task may include operating or handling machinery, loading or unloading objects, or assembling objects, among others.

In step 904, the application policy engine may receive metadata comprising reference data associated with the subject, or environment data. For example, the application policy engine 102 may receive the reference data 114 associated with the subject 304, or the environment data 112. The environment data 112 may include location specific data or the application specific data. The reference data 114 may be received by the device 308 from the cloud 312 based on an identifier as discussed with reference to step 5 in FIG. 3. A portion of the reference data 114 (e.g., DMV record, criminal background, medical background, etc.) may alternatively be received by the device 308 from the external entities having access to those records using the respective APIs. Different portions of the environment data 112 can be received by the device 308 from the command center 310, the cloud 312 or directly from the external entities as discussed with reference to FIG. 3. In certain examples, a portion of the environment data 112 (e.g., application specific data) may have been stored locally on the apparatus 400 prior to the incident. In certain examples, the baseline reference ML model 600b associated with the subject 304 can be downloaded from the ML models 804b as part of the metadata. In one example, the apparatus 400 may store the generic ML model 600a (and other dedicated ML models) locally which may have been downloaded on the apparatus 400 when the network connectivity was available (e.g., prior to encountering the subject 304). The ML models can be received by the apparatus 400 via the network interface 418 and can be stored as part of the ML models 410 for execution by the AI engine 104.

In one example, the application policy engine 102 may generate an identifier using the identifier generator 500d which can be used to retrieve a portion of the metadata. In another example, the identifier may be generated by the remote server computer 802 using the identifier generator 806b as discussed with reference to FIG. 8. The identifier can be generated using the real time input data stream (e.g., face recognition, voice recognition, vehicle registration number, etc.), or the subject's DL number, SSN, DOB, phone number, iris scan, retina scan, or fingerprints, among others. The reference data 114 can be retrieved from the reference data 804c using the metadata retriever 806c and the storage memory interface 812, and can be sent to the device 308 using the network interface 808. The reference data 114 and the environment data 112 can be received by the apparatus 400 via the network interface 418 and can be stored as part of the incident data 412.

In the other example, for the application associated with the business organization, the application policy engine 102 may receive the reference data 114 based on an identifier associated with the given worker. The application policy engine 102 may receive the environment data 112 from a command center or a cloud associated with the business organization, or directly from the external entities. The application policy engine 102 may also receive the reference data 114 and any suitable ML models 410 from the cloud. The ML models 410 may have been trained with the offline training data associated with performing the task using safety guidelines and any other suitable criteria based on the application. In certain examples, the metadata received by the apparatus 400 may be converted to a format suitable to be used by the AI engine 104. Note that the steps 902 and 904 can be performed in any order, or in parallel.

In step 906, the application policy engine may process the real time input data stream using the ML model to infer biometric characteristics associated with the subject. As discussed with reference to FIG. 4, the application policy engine 102 may use the one or more ML models 410 (e.g., the generic ML model 600a, baseline reference ML model 600b, or the dedicated ML models 600c) to process the real time input data stream to infer the biometric characteristics (e.g., facial expressions, emotions, tone, body language or movement, among others) associated with a subject. For example, the AI engine controller 500f may be used to manage the execution of the ML models 410 by the AI engine 104 to infer certain facial expressions, tone, emotions, body language or movements associated with the subject 304. Use of the baseline reference ML model 600b can provide more accurate predictions than the generic ML model 600b. In certain examples, the baseline reference ML model 600b can be used to determine whether the subject 304 is under the influence of drugs or alcohol as discussed with reference to FIG. 3. In certain examples, the dedicated ML models 600c may be used to infer specific biometric characteristics. The multiple ML models 410 can be executed in parallel by the AI engine 104 to accelerate the inferencing of different biometric characteristics. For example, the compute engine(s) 602a can execute the one or more ML models 600a-600c simultaneously.

In another example, for the application associated with the business organization, the application policy engine 102 may use the one or more ML models 410 to process the real time input data stream to infer certain biometric characteristics associated with the worker. In certain examples, the AI engine 104 may execute the baseline reference ML model 600b associated with the worker to infer facial expressions, body posture or certain movements of the worker associated with performing of the task.

In step 908, the application policy engine 102 may determine whether the application policy has been violated, conformed to, or missed based on a correlation between the metadata and the inferred biometric characteristics. The inferred biometric characteristics may be determined by executing the ML models 600a-600c. The policy conformance detector 500g can determine whether the application policy 408 has been violated, conformed to, or missed based on the correlation between the metadata and the inferred biometric characteristics. The metadata may include the reference data 114 or the environment data 112. The application policy engine 102 may generate the policy violation 118, the policy conformance 120, or the policy miss 122 accordingly. For example, if the reference data 114 indicates criminal history, the environment data 112 indicates a nearby criminal activity, and the inferred biometric characteristics indicate a threatening tone and the subject 304 pointing the firm arm 306, the policy conformance detector 500g may determine that the application policy 408 has been violated by comparing the correlation results with the policy threshold 704 as discussed with reference to FIG. 7. The application policy engine 102 may assert the policy violation 118 to indicate that the application policy 408 has been violated.

In another example, for the application associated with the business organization, the application policy engine 102 may determine whether the application policy 408 has been violated, conformed to, or missed based on the correlation between the metadata and the inferred biometric characteristics associated with the worker. For example, the reference data 114 may indicate accident prone history associated with the worker to perform the same task, the environment data 112 may indicate acceptable operating condition of the machinery, and the inferred biometric characteristics may indicate that the worker incorrectly performed the task. Based on the correlation, the policy conformance detector 500g may determine that the application policy 408 has been violated.

In step 910, the application policy engine may provide a recommendation for an action based upon the determination. For example, the application policy engine 102 may provide a first recommendation for a first action based upon the determination that the application policy 408 was violated, a second recommendation for a second action based upon the determination that the application policy 408 was conformed to, or a third recommendation for a third action based upon the determination that the application policy 408 was missed. The recommendation generator 500h may provide the recommendation 706 for the action as defined by the rule in the application policy 408. For example, the application policy engine 102 may recommend arresting the subject 304, using the firearm 306, or releasing the subject 304. In another example, the recommendation generator 500h may provide the recommendation 706 for the action as generating an alert or an alarm, and enable the apparatus 400 to shut down the system. The policy conformance 120, policy violation 118, or the policy miss 122 along with the recommendation 706 for the action can be displayed as a text message or an image, played as an audio message, or represented in another suitable way using a respective API. The summary generator 500i may generate a summary of the incident to be stored in the cloud, which can be used for referencing or archival.

As discussed with reference to FIGS. 1-9, systems and methods to perform automated threat detection and evaluation using an application policy engine are disclosed. Use of AI to recommend an action based on the factual data can eliminate undesirable outcomes generally resulting from erroneous human actions based on human biases, emotions, insufficient time or information. Certain embodiments can use the application policy engine to determine policy enforcement for various applications based on the respective application policies. In certain embodiments, use of a baseline reference ML model can increase prediction accuracy or detect identity theft. Additionally, use of edge computing can allow executing the automated threat detection process autonomously during failed connectivity with the remote server.

It will be understood that various embodiments described herein are by way of example only, and are not intended to limit the scope of the disclosure. The present invention as claimed may therefore include variations from the particular examples and various embodiments described herein, as will be apparent to one of skill in the art.

What is claimed is:

1. A computer-implemented method comprising:
receiving, by an application policy engine, a real time input data stream comprising a video data stream or an audio data stream, the application policy engine configured to execute a machine learning (ML) model;
receiving, by the application policy engine, metadata comprising reference data associated with a subject, or environment data;
processing, by the application policy engine, the real time input data stream using the ML model to infer biometric characteristics associated with the subject;
determining, by the application policy engine, a policy compliance status from a plurality of policy compliance statuses for an application policy including at least a first policy compliance status corresponding to a policy violation, a second policy compliance status corresponding to a policy conformance, and a third policy compliance status corresponding to a policy miss based on a correlation between the metadata and the inferred biometric characteristics; and
providing, by the application policy engine based upon the determination, a recommendation for an action from recommendations specified in the application policy corresponding to the policy compliance status.

2. The computer-implemented method of claim 1, wherein the subject is a human, and wherein inferring the biometric characteristics associated with the subject includes predicting facial expressions, emotions, tone, body language or movements of the subject based on the real time input data stream.

3. The computer-implemented method of claim 1, wherein the application policy includes rules and corresponding recommendations specific to an application associated with an organization.

4. The computer-implemented method of claim 1, wherein determining the policy compliance status includes comparing a correlation result to a policy threshold.

5. The computer-implemented method of claim 1, wherein the reference data associated with the subject includes one or more of criminal background, biometric data, residential history, employment history, medical history, family history, registered firearms, registered vehicles, or a drive record of the subject.

6. The computer-implemented method of claim 1, wherein the environment data comprises location specific data associated with a location of the subject, or application specific data for an application associated with an organization.

7. The computer-implemented method of claim 1, wherein the ML model is a baseline reference ML model associated with the subject, wherein the baseline reference ML model has been trained based on a baseline profile of the subject to perform a task and wherein the real time input data stream corresponds to the subject performing same task.

8. The computer-implemented method of claim 7, wherein the task includes speaking predetermined phrases or performing certain movements.

9. The computer-implemented method of claim 1 further comprising:
  patching, by the application policy engine, a portion of the ML model upon determining the policy miss, wherein the application policy engine processes the real time input data stream using the patched ML model to infer the biometric characteristics associated with the subject.

10. The computer-implemented method of claim 1, wherein the application policy is associated with a business organization and the subject is a human worker, and wherein the ML model has been trained using training data associated with performing a task in compliance with safety guidelines for an application associated with the business organization.

11. The computer-implemented method of claim 10, wherein the determination of the policy violation indicates violation of the safety guidelines, and wherein the recommendation includes generating an alert.

12. The computer-implemented method of claim 1, wherein the reference data is received using an identifier associated with the subject, wherein the identifier is generated using the real time input data stream based on face recognition, voice recognition, or a vehicle registration number associated with the subject.

13. A non-transitory computer readable medium storing a program, the program when executed by a processor causes the processor to:
  receive a real time input data stream comprising a video data stream or an audio data stream;
  receive metadata comprising reference data associated with a subject, or environment data;
  process the real time input data stream using a machine learning (ML) model to infer biometric characteristics associated with the subject;
  determine a policy compliance status from a plurality of policy compliance statuses for an application policy including at least a first policy compliance status corresponding to a policy violation, a second policy compliance status corresponding to a policy conformance, and a third policy compliance status corresponding to a policy miss based on a correlation between the metadata and the inferred biometric characteristics; and
  provide, based upon the determination, a recommendation for an action from recommendations specified in the application policy corresponding to the policy compliance status.

14. The non-transitory computer readable medium of claim 13, wherein the processor is part of an application policy engine comprising an artificial intelligence (AI) engine configured to execute the ML model.

15. The non-transitory computer readable medium of claim 13, wherein the correlation between the metadata and the inferred biometric characteristics is determined based on respective weight values for each of the metadata and the inferred biometric characteristics.

16. An apparatus comprising:
  an interface to receive a real time input data stream comprising a video data stream or an audio data stream;
  a network interface to receive metadata; and
  an application policy engine comprising a processor configured to:
    process the real time input data stream using a machine learning (ML) model to infer biometric characteristics associated with a subject;
    determine a policy compliance status from a plurality of policy compliance statuses for an application policy including at least a first policy compliance status corresponding to a policy violation, a second policy compliance status corresponding to a policy conformance, and a third policy compliance status corresponding to a policy miss based on a correlation between the metadata and the inferred biometric characteristics; and
    provide, based upon the determination, a recommendation for an action from recommendations specified in the application policy corresponding to the policy compliance status.

17. The apparatus of claim 16, wherein the subject is a human, and wherein the metadata comprises reference data associated with the subject, or environment data comprising location specific data and application specific data.

18. The apparatus of claim 16, wherein the application policy is associated with a law enforcement organization and the apparatus is part of a device belonging to a law enforcement officer, and wherein based upon the determination of the policy conformance, the processor is further configured to disable a firearm belonging to the law enforcement officer.

19. The apparatus of claim 16, wherein the application policy is associated with a business organization and the inferred biometric characteristics correspond to the subject performing a task for an application associated with the business organization, and wherein determination of the policy violation indicates violation of safety guidelines in performing the task.

20. The apparatus of claim 16, further comprising memory, wherein the ML model and the application policy are stored in the memory, and the apparatus is part of an edge device.

* * * * *